(12) United States Patent
Kudo et al.

(10) Patent No.: US 12,125,097 B2
(45) Date of Patent: Oct. 22, 2024

(54) AUTOMATIC BIDDING SYSTEM AND AUTOMATIC BIDDING METHOD FOR POWER TRADING

(71) Applicant: TOYOTA JIDOSHA KABUSHIKI KAISHA, Toyota (JP)

(72) Inventors: Yuki Kudo, Susono (JP); Kazutaka Kimura, Mishima (JP); Kazuki Obata, Susono (JP); Hiromitsu Kigure, Kanagawa-ken (JP); Satoshi Kikuchi, Hadano (JP); Yuta Maniwa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 17/934,592

(22) Filed: Sep. 23, 2022

(65) Prior Publication Data

US 2023/0124457 A1    Apr. 20, 2023

(30) Foreign Application Priority Data

Oct. 15, 2021   (JP) ................. 2021-169663

(51) Int. Cl.
*G06Q 50/00* (2024.01)
*G06Q 30/08* (2012.01)
*G06Q 50/06* (2012.01)

(52) U.S. Cl.
CPC ........... *G06Q 30/08* (2013.01); *G06Q 50/06* (2013.01)

(58) Field of Classification Search
CPC ............... G06Q 30/08; G06Q 50/06

USPC ................................. 705/4, 35–45
See application file for complete search history.

(56) References Cited

U.S. PATENT DOCUMENTS

| | | | |
|---|---|---|---|
| 2013/0253973 A1 | 9/2013 | Ishibashi | |
| 2013/0275290 A1* | 10/2013 | Arakawa | G06Q 50/06 705/37 |
| 2014/0188695 A1* | 7/2014 | Maegawa | G06Q 30/08 705/37 |
| 2015/0195641 A1* | 7/2015 | Di Censo | H04R 1/1083 381/71.6 |

FOREIGN PATENT DOCUMENTS

| | | | | |
|---|---|---|---|---|
| JP | 2012125063 A | | 6/2012 | |
| JP | 2020009334 A | | 1/2020 | |
| JP | 2020053895 A | | 4/2020 | |
| JP | 2021164303 A | | 10/2021 | |
| JP | 2022128299 A | * | 9/2022 | .......... G06Q 50/06 |
| KR | 101676427 B1 | * | 12/2014 | .......... G06Q 50/06 |
| KR | 20180112459 A | * | 4/2017 | .......... G06Q 50/06 |

* cited by examiner

*Primary Examiner* — Cho Kwong
*Assistant Examiner* — Mohammed H Mustafa
(74) *Attorney, Agent, or Firm* — Dickinson Wright, PLLC

(57) ABSTRACT

An automatic bidding system includes a vehicle agent (a computer). A vehicle agent includes a bidding agent (a bidding unit) that places an automatic bid for power trading related to electric power of a user in accordance with an automatic bidding algorithm, and an information collection agent (an information collection unit) that acquires user information indicating a preference of the user. The bidding agent is configured to set a parameter of the automatic bidding algorithm using the user information.

8 Claims, 14 Drawing Sheets

FIG. 5

POWER TRADING RESULT REPORT

TARGET PERIOD: LAST MONTH — M11

POWER PURCHASE UNIT PRICE: 9.3 YEN/kWh
RENEWABLE ENERGY RATIO: 23%

PLEASE ANSWER QUESTIONNAIRE — M12

- ☐ POWER PURCHASE UNIT PRICE IS TOO HIGH
- ☐ RENEWABLE ENERGY RATE IS TOO LOW
- ☑ BOTH ARE JUST RIGHT

— M13

CHECK IF YOU ARE ANXIOUS ABOUT REMAINING BATTERY LEVEL ☑

— M14

ENTER

OTHERS

REMAINING BATTERY LEVEL — M21

CONSTANT: 30% (LOWER LIMIT)
AT START OF TRAVELING: 100%

TRADING PARTY — M31

NO SETTING

— M22

CHANGE

— M32

CHANGE

FIG. 7

TRADING PARTY SETTING

CURRENT SETTING  — M201

[ NO TRADING PARTY DESIGNATED ]

PLEASE SET TRADING PARTY  — M202

- ☐ RENEWABLE ENERGY
- ☐ SOLAR POWER GENERATION
- ☑ WIND GENERATION
  ⋮
- ☐ AREA DESIGNATION
  [ DESIRED AREA: _____ ]
  ⋮
- ☐ INDIVIDUAL
  [ PERSONAL ID: _____ ]
  ⋮

— M203  LIMITATION

— M204  PRIORITY

— M205  BACK TO PREVIOUS SCREEN

AUTOMATIC BIDDING SYSTEM AND AUTOMATIC BIDDING METHOD FOR POWER TRADING

CROSS-REFERENCE TO RELATED APPLICATION

This application claims priority to Japanese Patent Application No. 2021-169663 filed on Oct. 15, 2021, incorporated herein by reference in its entirety.

BACKGROUND

1. Technical Field

The present disclosure relates to an automatic bidding system and an automatic bidding method for power trading.

2. Description of Related Art

For example, Japanese Unexamined Patent Application Publication No. 2020-9334 (JP 2020-9334 A) discloses a power trading platform on which each member can purchase and sell electric power.

SUMMARY

In the related art, a power trading system has been developed for users to purchase electric power at a low price. However, in recent years, user preferences related to power trading are diverse, and users are not always satisfied just by purchasing electric power at a low price. In addition, since there are few users who have knowledge about power trading, it is desirable that bidding for power trading is executed automatically. In the above-mentioned JP 2020-9334 A, such issues have not been sufficiently examined.

The present disclosure has been made to solve the above-mentioned issues, and an object thereof is to facilitate purchase of electric power through automatic bidding under the conditions preferred by the user.

An automatic bidding system according to a first aspect of the present disclosure includes a computer. The computer includes a bidding unit that places an automatic bid for power trading in accordance with an automatic bidding algorithm related to electric power of a user, and an information collection unit that acquires user information indicating a preference of the user. The bidding unit is configured to set a parameter of the automatic bidding algorithm using the user information.

In the above automatic bidding system, the information collection unit acquires the user information. Then, the bidding unit places an automatic bid for power trading in accordance with the automatic bidding algorithm in which the preference of the user is reflected. According to the above-mentioned automatic bidding system, purchase of electric power under the conditions preferred by the user is facilitated. An objective function may be used as the automatic bidding algorithm.

The information collection unit above may be configured to notify the user of a power trading result by the bidding unit in a predetermined period, and request the user for returning the user information indicating whether the user is satisfied with the power trading result.

According to the above configuration, the above-mentioned user information (information indicating the preference of the user) can be easily and appropriately acquired.

The power trading result above may include a unit price of electric power purchased by the bidding unit in the predetermined period and a ratio of predetermined electric power to the electric power purchased by the bidding unit in the predetermined period. When the information collection unit receives the user information indicating that the user is not satisfied with the unit price of electric power, the bidding unit may change the parameter of the automatic bidding algorithm such that the unit price of electric power to be purchased through automatic bidding is reduced. When the information collection unit receives the user information indicating that the user is not satisfied with the ratio of the predetermined electric power, the bidding unit may change the parameter of the automatic bidding algorithm such that the ratio of the predetermined electric power to be purchased through automatic bidding is increased.

Hereinafter, the unit price of electric power purchased by the bidding unit in the predetermined period will be also referred to as a "power purchase unit price". Further, a ratio of the predetermined electric power to the electric power purchased by the bidding unit in the predetermined period will be also referred to as a "purchased power ratio". The power purchase unit price may be the purchase price (yen/kWh) per unit electric energy. The predetermined electric power may consist of all types of renewable energies, a specific renewable energy (for example, electric power generated by wind power generation), or electric power generated in a predetermined area.

According to the above configuration, the purchase of electric power under the conditions preferred by the user (the power purchase unit price and the purchased power ratio) is facilitated.

The predetermined period above may be set each time the predetermined period elapses. The information collection unit may be configured to repeatedly notify the power trading result and request for returning the user information each time the predetermined period elapses.

According to the above configuration, the power trading conditions (parameters of the automatic bidding algorithm) can be changed in accordance with changes in a preference of a person.

The above predetermined period may be one week (current week) or one month (current month). For example, in the case where the current month is January, when January ends, the user may be notified of the power trading result in January, and February may be set as the next predetermined period.

Any of the automatic bidding systems described above may further include a user terminal operated by the user. The information collection unit may be configured to acquire the user information from the user terminal. The user terminal may be configured to generate the user information using information input from the user and transmit the generated user information to the computer.

According to the above configuration, the user terminal generates the above-mentioned user information (information indicating the preference of the user). Then, the information collection unit can acquire the user information from the user terminal.

The user terminal above may be configured to classify a preference of the user based on an analysis result of voice information input from the user.

According to the above user terminal, the user information (information indicating the preference of the user) is automatically generated based on the conversation of the user. Therefore, a labor of the user for generating the user information is reduced.

The user terminal may be configured to infer a behavior pattern of the user based on the information input from the user and classify a preference of the user based on the inferred behavior pattern of the user.

According to the above user terminal, the user information (information indicating the preference of the user) is automatically generated based on the behavior pattern of the user. Therefore, a labor of the user for generating the user information is reduced.

A vehicle of the user may be equipped with a power storage device that is chargeable using electric power purchased by the bidding unit. The bidding unit may be configured to be able to set a target state-of-charge value of the power storage device mounted on the vehicle. The bidding unit may be configured to purchase electric power for charging the power storage device such that the state-of-charge of the power storage device reaches the target state-of-charge value by a travel start time of the vehicle.

According to the above configuration, it becomes easy to set the state-of-charge (SOC) of the power storage device of the vehicle to the target SOC value by the travel start time using the electric power purchased under the conditions preferred by the user.

The bidding unit may be configured to be able to set a minimum state-of-charge value of the power storage device. The bidding unit may be configured to purchase electric power for charging the power storage device such that the state-of-charge of the power storage device does not fall below the target state-of-charge value.

According to the above configuration, it becomes easy to maintain the SOC of the power storage device of the vehicle at the minimum SOC value or more using the electric power purchased under the conditions preferred by the user.

An automatic bidding method for power trading according to a second aspect of the present disclosure includes preference information acquisition, bidding parameter setting, and bidding described below.

In the preference information acquisition, a computer acquires user information indicating a preference of a user. In the bidding parameter setting, the computer sets the parameter of an automatic bidding algorithm using the above user information. In the bidding, the computer places an automatic bid for the power trading related to electric power of the user in accordance with the automatic bidding algorithm.

Similar to the above-mentioned automatic bidding system, the above automatic bidding method for power trading also facilitates the purchase of electric power under the conditions preferred by the user.

According to the present disclosure, the purchase of electric power under the conditions preferred by the user can be facilitated by automatic bidding.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram showing an example of a screen on which the vehicle agent shown in FIG. 4 notifies a user of a power trading result and requests the user to input preference information;

FIG. 7 is a diagram showing an example of a screen for changing setting of a trading partner condition shown in FIG. 5;

DETAILED DESCRIPTION OF EMBODIMENTS

First Embodiment

Figure 1:
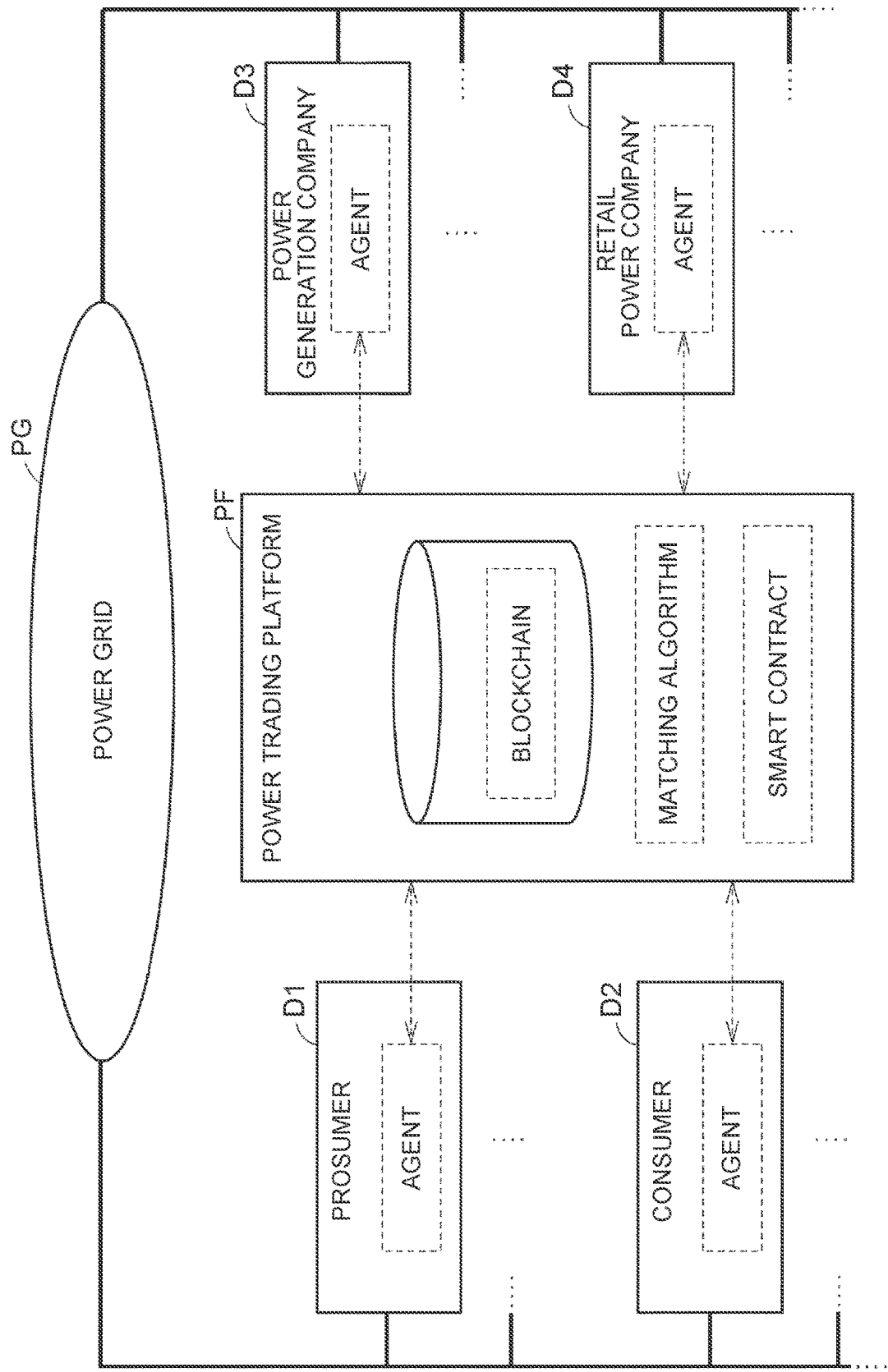
FIG. 1 is a diagram illustrating an outline of a power trading method according to a first embodiment of the present disclosure.

An embodiment of the present disclosure will be described in detail with reference to the drawings. In the drawings, the same or corresponding parts are denoted by the same reference signs and the description thereof will not be repeated.

FIG. 1 is a diagram illustrating an outline of a power trading method according to a first embodiment of the present disclosure. With reference to FIG. 1, a power trading platform PF according to the present embodiment is a peer-to-peer (P2P) power trading platform. For example, an aggregator uses the power trading platform PF to operate the power trading market. The power trading platform PF enables power trading between individuals. The power trading platform PF includes a blockchain ledger, a matching algorithm, and a smart contract.

A user of the power trading platform PF purchases and sells the electric power transmitted and distributed through a power grid PG. The power grid PG is connected to a large number of power generation facilities and power storage facilities (not shown) owned by various power companies, in addition to power generation facilities and power storage facilities (not shown) installed in various buildings. The supply and demand balance of the power grid PG is adjusted such that balancing is achieved. An aggregator corresponds to a balance responsible party (BRP). Each user of the power trading platform PF owns resources that can be electrically connected to the power grid PG.

The user of the power trading platform PF is registered in the power trading platform PF in advance. In the present embodiment, a plurality of prosumers D1, a plurality of consumers D2, a plurality of power generation companies D3, and a plurality of retail power companies D4 are registered in the power trading platform PF. The number of users registered in the power trading platform PF is arbitrary, and may be five or more and less than 100, or may be 100 or more.

Each registered user owns an asset and an agent. In the present embodiment, the resources owned by each user function as assets. The agent has a function of placing a bid on the power trading platform PF. This makes it possible to purchase and sell electric power on an individual basis. After the contract, the resource outputs the electric power sold by the user to the power grid PG, or receives the electric power purchased by the user from the power grid PG.

A power meter is provided between the power grid PG and the resource. The power meter measures at least one of electric energy output by the resource to the power grid PG (reverse power flow) and electric energy received by the resource from the power grid PG. The power meter sequentially transmits the measured value to the power trading platform PF. The measured value of the power meter may be transmitted to the power trading platform PF via an energy management system (EMS). The power meter may be a smart meter that measures daily demand power (the electric energy used by the user), or may be a dedicated terminal introduced for power trading. The power meter may be provided for each resource, or one power meter (common power meter) may be provided for a plurality of resources. The EMS in the prosumer D1 may be configured to manage the generated power and the demand power.

Hereinafter, the power trading executed through the power trading platform PF will be described by taking the case where the prosumer D1 sells the electric power to the consumer D2 as an example.

First, the aggregator purchases a token from an exchange (not shown). This token will be used as a fee to fulfill the smart contract. Then, the prosumer D1 places a sell bid (price offer), and the consumer D2 places a purchase bid (price request). When both bids are placed, the matching algorithm matches the sell bid with the purchase bid after funds validation.

A bidder presents the price and electric energy (kWh) at the time of bidding. In addition, the bidder can place a bid with additional information by tags. For example, the purchase bidder can specify purchase conditions (desired power type, trading partner, etc.) in detail by a tag. The matching algorithm takes into account the additional information indicated by the tag, in addition to the price and the electric energy.

When the matching between the prosumer D1 and the consumer D2 is successful, the consumer D2 pays the aggregator an electricity charge in legal tender (for example, JPY, USD, GBP, or EUR). After that, the aggregator deposits the above token on the power trading platform PF. The prosumer D1 supplies the electric energy (kWh) presented at the time of bidding to the power grid PG. The consumer D2 receives the electric energy (kWh) presented at the time of bidding from the power grid PG. The smart contract executes the power trading after proof of delivery. Specifically, the smart contract returns the deposited token to the aggregator and updates the blockchain ledger (for example, the local network ledger) that records the transaction.

When the power trading is executed by the smart contract, the aggregator pays the prosumer D1 the amount of legal tender corresponding to the trading result. Further, the aggregator also settles trading costs (consignation fees, platform costs, etc.).

The record of the blockchain ledger of the power trading platform PF is reflected in the ledger of the external platform (for example, the Ethereum ledger). The aggregator disposes of the first token purchased at the exchange after trading is completed in order to limit the amount of tokens distributed.

As described above, the aggregator plays a central role in trading tokens on the power trading platform PF, making payment of electricity charges, and making payment of consignation charges. Note that, the process by the aggregator is executed on, for example, a server (not shown).

Figure 2:
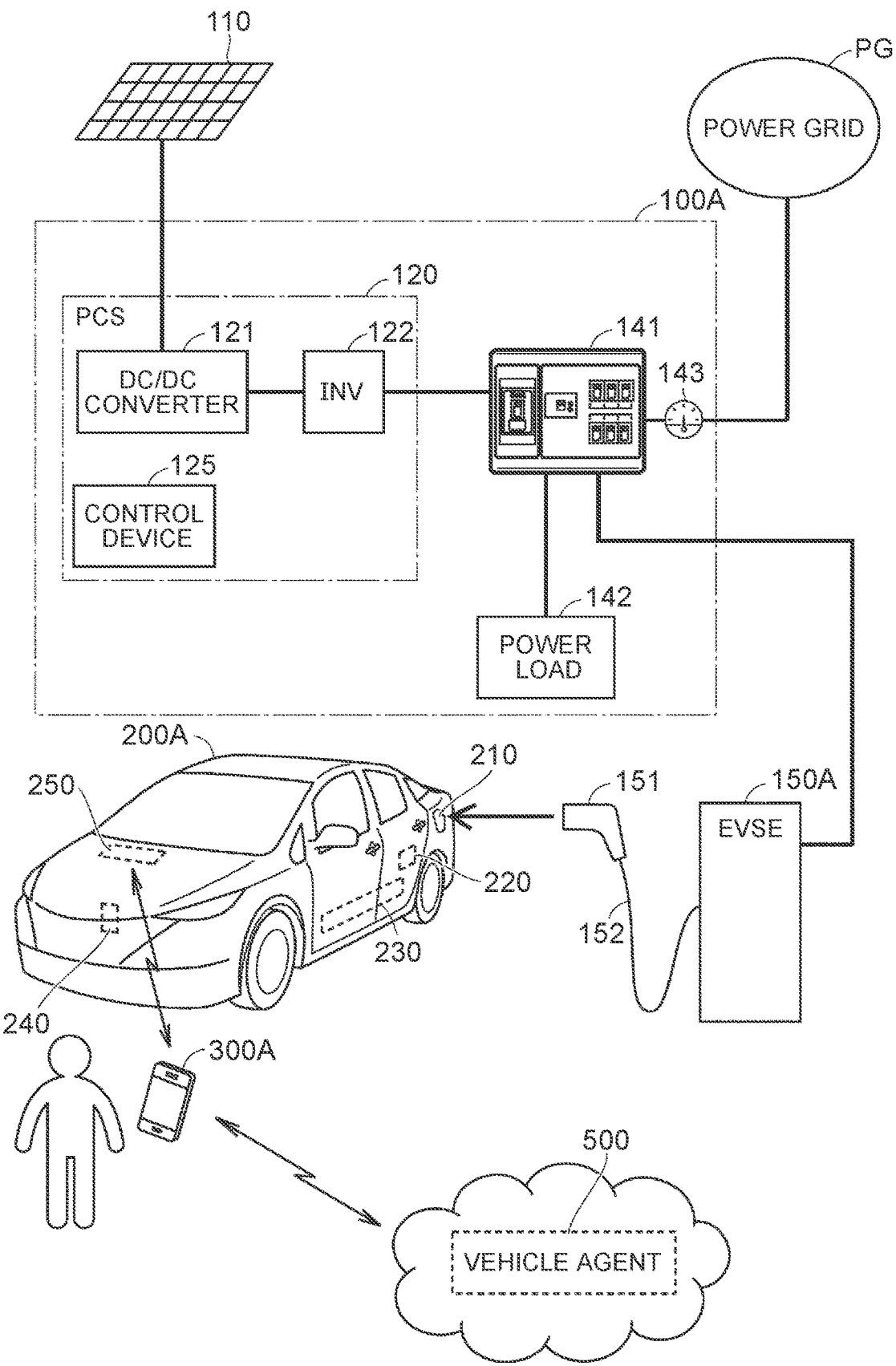
FIG. 2 is a diagram showing an example of a power facility of a prosumer shown in FIG. 1.

FIG. 2 is a diagram showing an example of a power facility of the prosumer D1. With reference to FIG. 1 and FIG. 2, a solar panel 110 is installed on the roof of a house 100A of the prosumer D1. Inside the house 100A, a power conditioning system (PCS) 120, a distribution board 141, and a power load 142 are provided. Electric vehicle supply equipment (EVSE) 150A is installed on the premises (outdoors) of the home of the user. Further, a smart meter 143 is installed between the power grid PG and the distribution board 141.

The solar panel 110 uses sunlight for power generation. The solar panel 110 is a naturally fluctuating power source of which power generation output fluctuates depending on the weather conditions, and outputs the generated electric power to the PCS 120. The PCS 120 has a function of converting generated electric power into grid power (electric power of the power grid PG). The PCS 120 includes a direct current (DC)/DC converter 121, an inverter 122, and a control device 125. The control device 125 is configured to control each of the DC/DC converter 121 and the inverter 122 based on, for example, the electric power generated by the solar panel 110 and the power consumption (demand power) at the home of the user.

The DC/DC converter 121 transforms the DC power generated by the solar panel 110 into a voltage corresponding to the grid power. Then, the inverter 122 converts the DC power output from the DC/DC converter 121 into alternating current (AC) power corresponding to the grid power and outputs the AC power to the distribution board 141. The control device 125 can adjust the electric power input from the solar panel 110 to the distribution board 141 by controlling at least one of the DC/DC converter 121 and the inverter 122.

Electric power (for example, three-phase AC power) is supplied from each of the power grid PG and the solar panel 110 (the PCS 120) to the distribution board 141. The power load 142 is an electric device used indoors, and is supplied with electric power from the distribution board 141. The power load 142 may be connected to the distribution board 141 via an outlet (not shown). The power load 142 may be a household electric appliance such as a lighting fixture, an air conditioner, a cookware, an information device, a refrigerator, or a washing machine.

The EVSE 150A is equipment that supplies electric power to the vehicle, and receives electric power from the distribution board 141. The vehicle and the power grid PG are electrically connected to each other as a connector 151 of a charging cable 152 connected to the main body of the EVSE 150A is connected to (plugged in) the inlet of the vehicle. Hereinafter, a state in which the vehicle and the power grid PG are electrically connected to each other will be referred to as a "plug-in state". Further, a state in which the vehicle and the power grid PG are not electrically connected to each other will be referred to as a "plug-out state". The traveling vehicle is in the plug-out state.

A vehicle 200A is an xEV that can travel using the electric power stored in a power storage device. The xEV is a vehicle that uses electric power as all or part of a motive power source. Specifically, the vehicle 200A includes an inlet 210, a charger 220, a battery 230, a motor 240, and an electronic control unit (ECU) 250. The vehicle 200A supplies electric power from the battery 230 to the motor 240 and travels by the power generated by the motor 240. The motor 240 may be a motor generator (MG). The vehicle 200A is, for example, a battery electric vehicle (BEV). However, the present disclosure is not limited to this, and xEVs other than BEVs can also be adopted.

The vehicle 200A is configured to be electrically connectable to the power grid PG via the EVSE 150A. The inlet 210 is configured to be connectable to the connector 151 of the EVSE 150A. The charger 220 is located between the inlet 210 and the battery 230 and is controlled by the ECU 250. The charger 220 includes, for example, an inverter. The battery 230 is an energy storage device for traveling. As the battery 230, a known vehicle power storage device (for example, a liquid secondary battery, an all-solid-state secondary battery, or an assembled battery) can be adopted. Examples of a vehicle secondary battery include a lithium ion battery and a nickel-metal hydride battery. When electric power is supplied from the power grid PG to the vehicle 200A in the plug-in state, the ECU 250 controls the charger 220 such that appropriate electric power is input from the inlet 210 to the battery 230. The ECU 250 executes charging control of the battery 230 in accordance with charging parameters (minimum state-of-charge (SOC) and target SOC) that will be described later.

The ECU 250 communicates with a mobile terminal 300A via a wireless communication device (not shown) mounted on the vehicle 200A. The mobile terminal 300A and the vehicle 200A perform short-range communication (that is, direct communication within a range around the vehicle) such as near field communication (NFC) or Bluetooth (registered trademark). The mobile terminal 300A is operated by the user. In the present embodiment, a smartphone equipped with a touch panel display is adopted as the mobile terminal 300A. However, the mobile terminal 300A is not limited to this, and any mobile terminal can be adopted, and a laptop, a tablet terminal, a wearable device (for example, a smart watch or a smart glass), an electronic key, or the like can also be adopted.

The vehicle 200A includes various sensors (not shown) for detecting the state of the vehicle 200A. The vehicle 200A transmits the state of the vehicle 200A detected by these sensors to the mobile terminal 300A. The vehicle 200A transmits, for example, the current position (for example, longitude and latitude), SOC, and grid connection state (plug-in state or plug-out state) to a vehicle agent 500 via the mobile terminal 300A. The SOC of the vehicle 200A means the SOC of the battery 230. The SOC indicates the remaining amount of electric power stored in the power storage device, and represents, for example, the ratio of the current power storage amount to the power storage amount in a fully charged state from 0% to 100%. In the present embodiment, when the vehicle 200A switches from the plug-out state to the plug-in state, the mobile terminal 300A requests the user to input the travel start time. Then, the mobile terminal 300A transmits the input travel start time to the vehicle agent 500.

In the present embodiment, the cloud server functions as the vehicle agent 500. The vehicle agent 500 is embodied by a processor (not shown) and a program executed by the processor. The vehicle agent 500 is provided on the cloud by cloud computing. The configuration of the vehicle agent 500 will be described later (see FIG. 4). In the power facility of the prosumer D1 shown in FIG. 2, each of the solar panel 110 (with the PCS 120), the power load 142, and the vehicle 200A corresponds to a resource.

Figure 3:
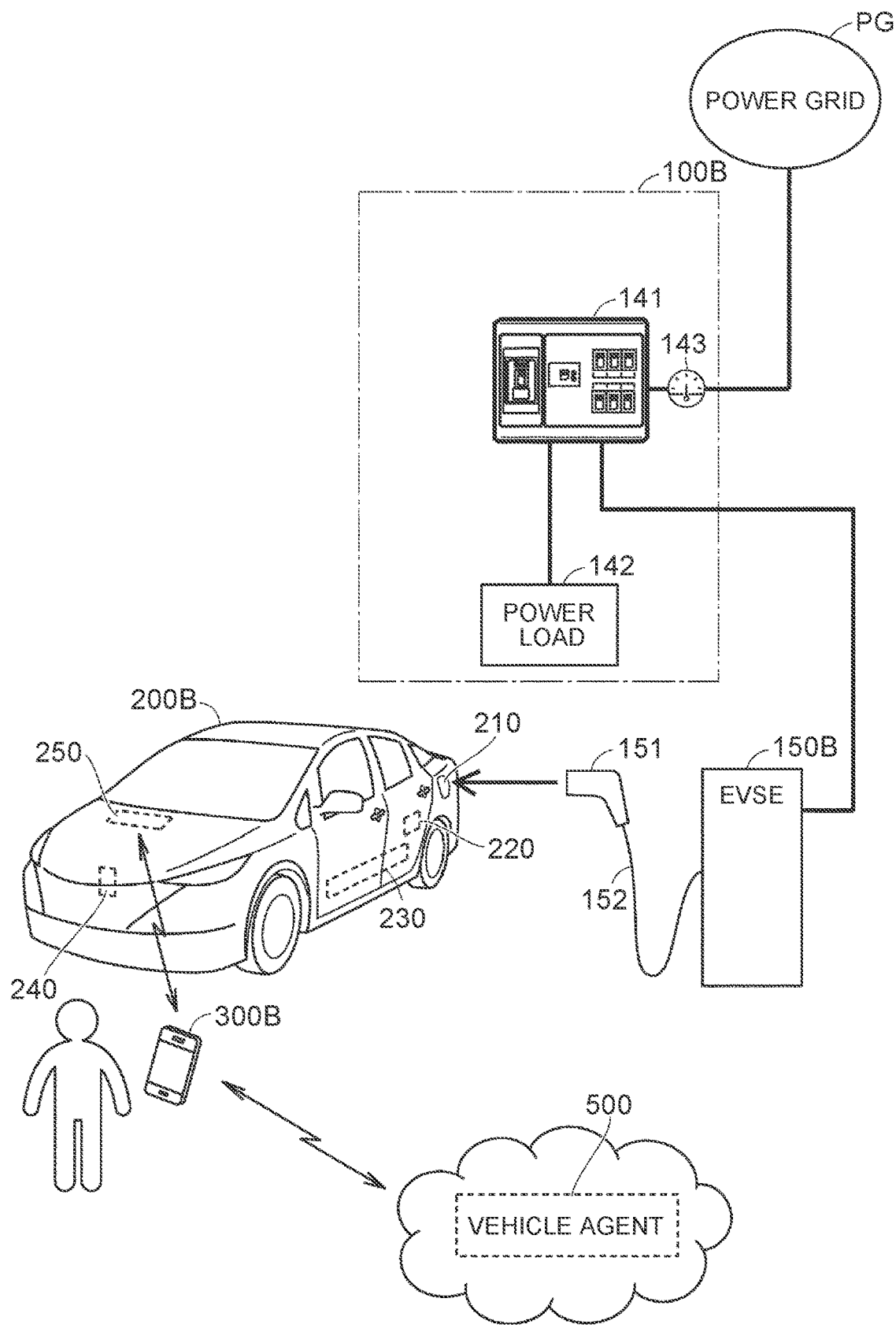
FIG. 3 is a diagram showing an example of a power facility of a consumer shown in FIG. 1.

FIG. 3 is a diagram showing an example of a power facility of the consumer D2. With reference to FIG. 1 and FIG. 3, a house 100B has the same configuration as the house 100A shown in FIG. 2 except that the house 100B does not include the solar panel 110 and the PCS 120. EVSE 150B, a vehicle 200B, and a mobile terminal 300B have the same configurations as the EVSE 150A, the vehicle 200A, and the mobile terminal 300A shown in FIG. 2, respectively.

For example, when a user who owns the vehicle concludes a predetermined contract with the aggregator, the aggregator registers the user in the power trading platform PF, and further, prepares the vehicle agent 500 for the user on the cloud. The vehicle agent 500 is prepared for each user who has signed the above contract with the aggregator. The vehicle agents 500 are managed separately for each user by a user identification (ID). In addition, the aggregator prepares a database on the cloud by cloud computing. In this database, the information on each user registered in the power trading platform PF is managed separately by the user ID. The user can use the vehicle agent 500 and the database in a cloud environment.

Figure 4:
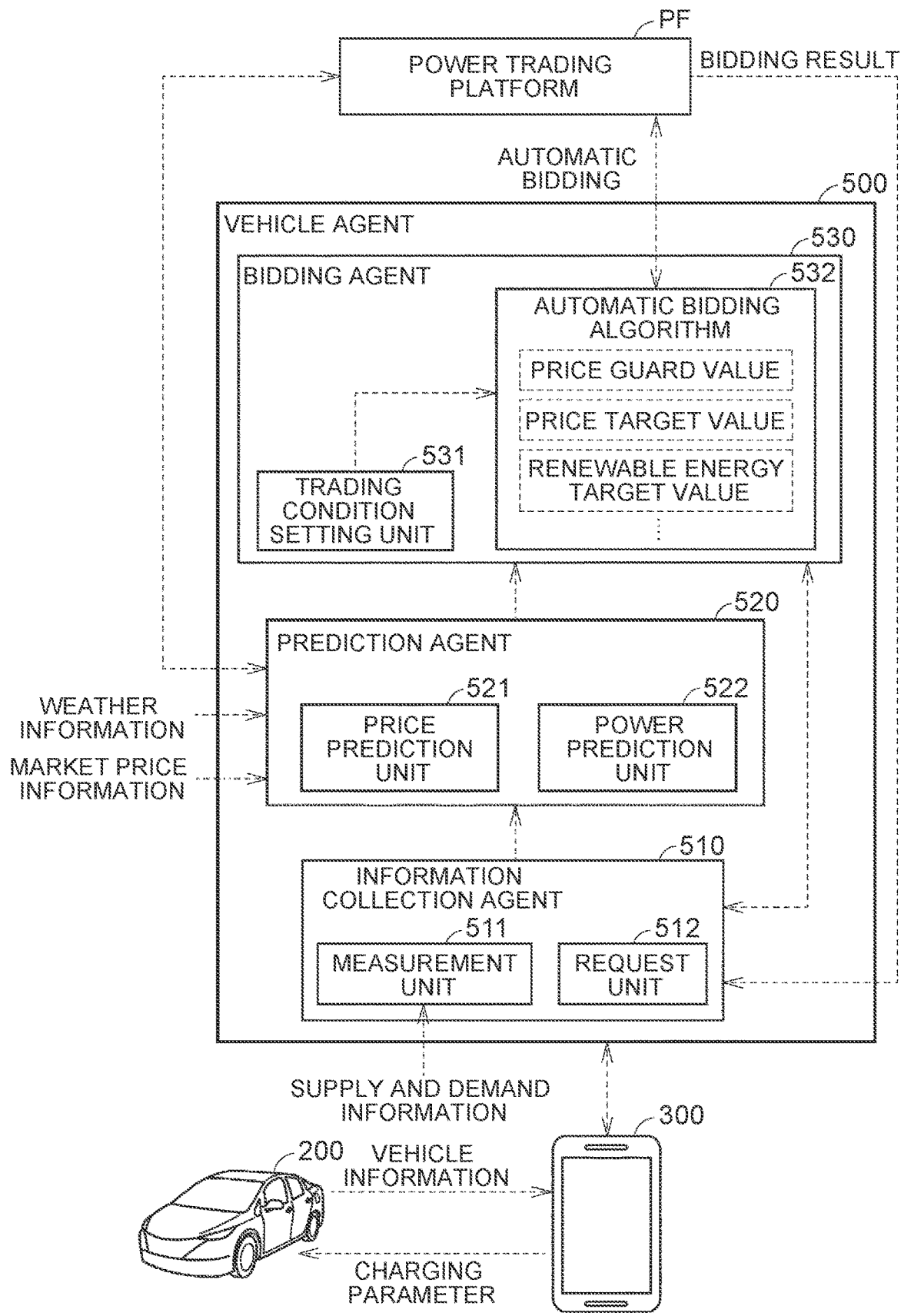
FIG. 4 is a diagram showing a detailed configuration of a vehicle agent (computer) according to the first embodiment of the present disclosure.

FIG. 4 is a diagram showing a detailed configuration of the vehicle agent 500. With reference to FIG. 4, the automatic bidding system according to the present embodiment includes a cloud server (computer) functioning as the vehicle agent 500, the power trading platform PF, a vehicle 200, and a mobile terminal 300. The vehicle 200 is a vehicle owned by the user registered in the power trading platform PF, and has the same configuration as the vehicle 200A (FIG. 2) described above, for example. The mobile terminal 300 is a device carried by a user registered in the power trading platform PF, and has the same configuration as the mobile terminal 300A (FIG. 2) described above, for example.

Predetermined application software (hereinafter, simply referred to as an "application") is installed in the mobile terminal 300. The mobile terminal 300 can exchange information with the vehicle agent 500 through the above application. The user can operate the above application through, for example, the touch panel display of the mobile terminal 300. Further, the touch panel display of the mobile terminal 300 notifies the user of the information.

The vehicle agent 500 executes the process while accessing the database on the cloud. The database contains information on the user (for example, the specifications of the power facility shown in FIG. 2 or FIG. 3). The vehicle agent 500 includes an information collection agent 510, a prediction agent 520, and a bidding agent 530.

The information collection agent 510 is configured to acquire and store vehicle information on the vehicle 200 and user information on the user. The information collection agent 510 includes a measurement unit 511 and a request unit 512. The information collection agent 510 corresponds to an example of an "information collection unit" according to the present disclosure.

The measurement unit 511 sequentially receives the measured values of the above-mentioned power meter (for example, the smart meter 143 shown in FIG. 2 or FIG. 3). The measurement unit 511 acquires user information indicating a supply and demand status of the user (hereinafter, referred to as "supply and demand information") related to the power grid PG from the power meter of the user. Further, the measurement unit 511 acquires vehicle information (for example, the position, the SOC, the grid connection state, and the travel start time) from the mobile terminal 300.

The request unit 512 requests the mobile terminal 300 for user information indicating a preference of the user (hereinafter referred to as "preference information"). The request unit 512 receives a reply of the preference information from the mobile terminal 300. The details of the preference information will be described later (see FIGS. 5 to 7).

The prediction agent 520 includes a price prediction unit 521 and a power prediction unit 522. The prediction agent 520 is configured to divide one day (for example, the next day) into predetermined time units and predict a power price, a power storage capacity, and required electric energy for each divided time slot. The predetermined time unit may be about 30 minutes, an hour or more and less than three hours, or three hours or more.

The price prediction unit 521 is configured to predict the power price (the sales price of the electric power) for each time slot in the power trading platform PF based on weather information (information indicating current or future weather conditions), market price information (information indicating power prices in the power market), and a trading status in the power trading platform PF. For example, the price prediction unit 521 can predict a variable renewable energy (VRE) power generation amount based on weather prediction data (weather, temperature, wind, etc.). As the VRE power generation amount increases, the power price tends to decrease.

The power prediction unit 522 is configured to predict the required electric energy for each time slot based on the supply and demand information acquired by the information collection agent 510. Specifically, the power prediction unit 522 predicts the power demand amount (power consumption) and the power generation amount for each time slot based on, for example, accumulated supply and demand history information (information indicating a past supply and demand status) and weather information (for example, weather forecast information), and calculates the required electric energy for each time slot based on the acquired prediction data. The required electric energy is calculated, for example, by subtracting the power generation amount from the power demand amount. As the power demand amount increases, the required electric energy increases.

The power prediction unit 522 is configured to predict the power storage capacity for each time slot based on the vehicle information acquired by the information collection agent 510. When the vehicle 200 is in the plug-in state, the power storage capacity is larger than when the vehicle 200 is in the plug-out state. The vehicle 200 in the plug-in state can store the electric power supplied from the power grid PG in the battery 230 (FIG. 2). As the SOC of the vehicle 200 in the plug-in state decreases, the power storage capacity increases. The power prediction unit 522 can predict the timing at which the vehicle 200 in the plug-in state enters the plug-out state (hereinafter, referred to as a "grid departure timing") based on the travel start time acquired by the information collection agent 510. Further, the power prediction unit 522 can predict the timing at which the vehicle 200 in the plug-out state enters the plug-in state (hereinafter, referred to as a "grid connection timing") based on the position and the SOC of the vehicle 200. In the present embodiment, the information collection agent 510 sequentially acquires the position and SOC of the vehicle 200. The mobile terminal 300 may request the user to input the travel end time indicating the grid connection timing, and may transmit the input travel end time to the vehicle agent 500. In the mode above, the power prediction unit 522 can predict the grid connection timing based on the travel end time.

The bidding agent 530 is configured to place a bid on the power trading platform PF. The bidding agent 530 places a bid to purchase the required electric energy for each time slot based on the power price for each time slot, the power storage capacity for each time slot, and the preference information. The power storage capacity allows (absorbs) a difference between a power supply timing and a power usage timing. As the power storage capacity increases, the degree of freedom in bidding becomes higher. For example, the bidding agent 530 can purchase and store the electric power to be used in the time slot when the power demand is high in advance in the time slot when the price is low. However, the bidding agent 530 respects the preference information when the bidding agent 530 determines a bidding target (electric power that is the target of the purchase bid).

After the bidding agent 530 places a bid, a bidding result (a power trading result) is transmitted from the power trading platform PF to the information collection agent 510. When a part of the required electric energy is successfully purchased on the power trading platform PF, the power prediction unit 522 updates the required electric energy by subtracting the purchased electric energy from the required electric energy. The present embodiment refers to a user whose power demand amount constantly exceeds the power generation amount. The user purchases a shortage amount of the electric power (required electric energy) on the power trading platform PF. However, the present disclosure is not limited to this, and the power prediction unit 522 may be configured to predict the surplus electric energy instead of the required electric energy when the power generation amount exceeds the power demand amount. The bidding agent 530 may be configured to place a sell bid on the power trading platform PF.

The bidding agent 530 includes a trading condition setting unit 531 and an automatic bidding algorithm 532. The bidding agent 530 is configured to place an automatic bid for the power trading in accordance with the automatic bidding algorithm 532 with respect to the electric power of the user. The automatic bidding algorithm 532 shows a processing procedure for automatic bidding. The automatic bidding algorithm 532 includes various parameters (for example, a price guard value, a price target value, a renewable energy target value, a minimum SOC, a target SOC, and a trading partner condition that will be described later). The trading condition setting unit 531 is configured to set the parameters of the automatic bidding algorithm 532 using the user information. The setting method of each parameter included in the automatic bidding algorithm 532 will be described later (see FIGS. 8 to 10). The bidding agent 530 corresponds to an example of a "bidding unit" according to the present disclosure.

Hereinafter, the preference information will be described with reference to FIGS. 5 to 7. The request unit 512 aggregates the power trading results (specifically, a power purchase unit price and a purchased power ratio) received from the power trading platform PF every time a predetermined period (hereinafter referred to as a "target period") elapses. In the present embodiment, the target period is one month. However, the target period can be changed as appropriate. The power purchase unit price is a price (yen/kWh) per unit electric energy of the electric power purchased by the bidding agent 530 during the target period. The purchased power ratio is a ratio of renewable energy to the entire electric power purchased by the bidding agent 530 in the target period (hereinafter, also referred to as a "renewable energy ratio"). Examples of renewable energies include solar, wind, geothermal and biomass. In the above aggregation, the average value in the target period is calculated.

The request unit 512 notifies the user of the power trading result by the bidding agent 530 in the target period, and requests a return of the user information (preference information) indicating whether the user is satisfied with the power trading result. The target period is updated regularly. In the present embodiment, the target period is set each time the target period elapses. The request unit 512 repeatedly executes the notification of the power trading result and the request for returning the preference information each time the target period elapses. For example, when a first target period elapses, the request unit 512 sets the next target period (second target period). Further, the request unit 512 notifies the user of the power trading result in the first target period, and requests the user to return the preference information with reference to the power trading result in the first target period.

FIG. 5 is a diagram showing an example of a screen for notifying the user of the power trading result and requesting the user to input the preference information. For example, at the beginning of February after January, the request unit 512 transmits a notification of the power trading results for January to the mobile terminal 300. With the above, the screen shown in FIG. 5 that will be described below is displayed on the touch panel display of the mobile terminal 300.

With reference to FIG. 5, the screen includes a power trading result M11, a first answer field M12, a second answer field M13, and an enter button M14.

The power trading result M11 indicates the power purchase unit price (average value) and the renewable energy ratio (average value) in the target period. The first answer field M12 includes a check box for answering whether the user is satisfied with the power trading result M11. The user can select any of the options indicating that "the power purchase unit price is too high" (hereinafter referred to as a "first answer item"), "the renewable energy ratio is too low" (hereinafter referred to as a "second answer item"), and "both are just right" (hereinafter referred to as a "third answer item") by checking the corresponding check box.

The second answer field M13 includes a check box for the user to answer whether the user is satisfied with the remaining battery level in the target period. The user can select whether the user is anxious about the remaining battery level using the check box.

When the user operates the enter button M14, the mobile terminal 300 transmits the answer result with respect to the above screen (whether the first to fourth answer items are checked) to the vehicle agent 500. Selection of the first answer item means that the user is not satisfied with the power purchase unit price. Selection of the second answer item means that the user is not satisfied with the renewable energy ratio. Selection of the third answer item means that the user is satisfied with the power trading result. When the fourth answer item is selected (checked), this means that the user is anxious about the remaining battery level. When the fourth answer item is not selected (checked), this means that the user is not anxious about the remaining battery level.

The screen shown in FIG. 5 further includes a charging condition M21 and a change button M22.

The charging condition M21 includes the current minimum SOC and the target SOC. The bidding agent 530 is configured to be able to set the minimum SOC and the target SOC value of the vehicle 200 having the configuration shown in FIG. 2. The minimum SOC value is set to a value lower than the target SOC value. In the vehicle 200, the ECU 250 controls the charger 220 in accordance with the minimum SOC and the target SOC. The battery 230 charged by the charger 220 is configured to be rechargeable using the electric power purchased by the bidding agent 530. The ECU 250 in which the minimum SOC value is set charges the battery 230 until the SOC of the battery 230 becomes equal to or higher than the minimum SOC value when the SOC of the battery 230 is lower than the minimum SOC value in the plug-in state. The bidding agent 530 purchases electric power for immediate charging up to the minimum SOC. The ECU 250 in which the target SOC value is set charges the battery 230 such that the SOC of the battery 230 reaches the target SOC value by the travel start time of the vehicle 200. The ECU 250 completes charging up to the target SOC value at a time (hereinafter, referred to as a "charging completion time") that goes back by a predetermined time from the travel start time. The bidding agent 530 purchases electric power such that charging to the target SOC value is completed at the charging completion time.

When the user operates the change button M22, the mobile terminal 300 displays the screen shown in FIG. 6 that will be described below. FIG. 6 is a diagram showing an example of a charging condition setting screen.

Figure 6:
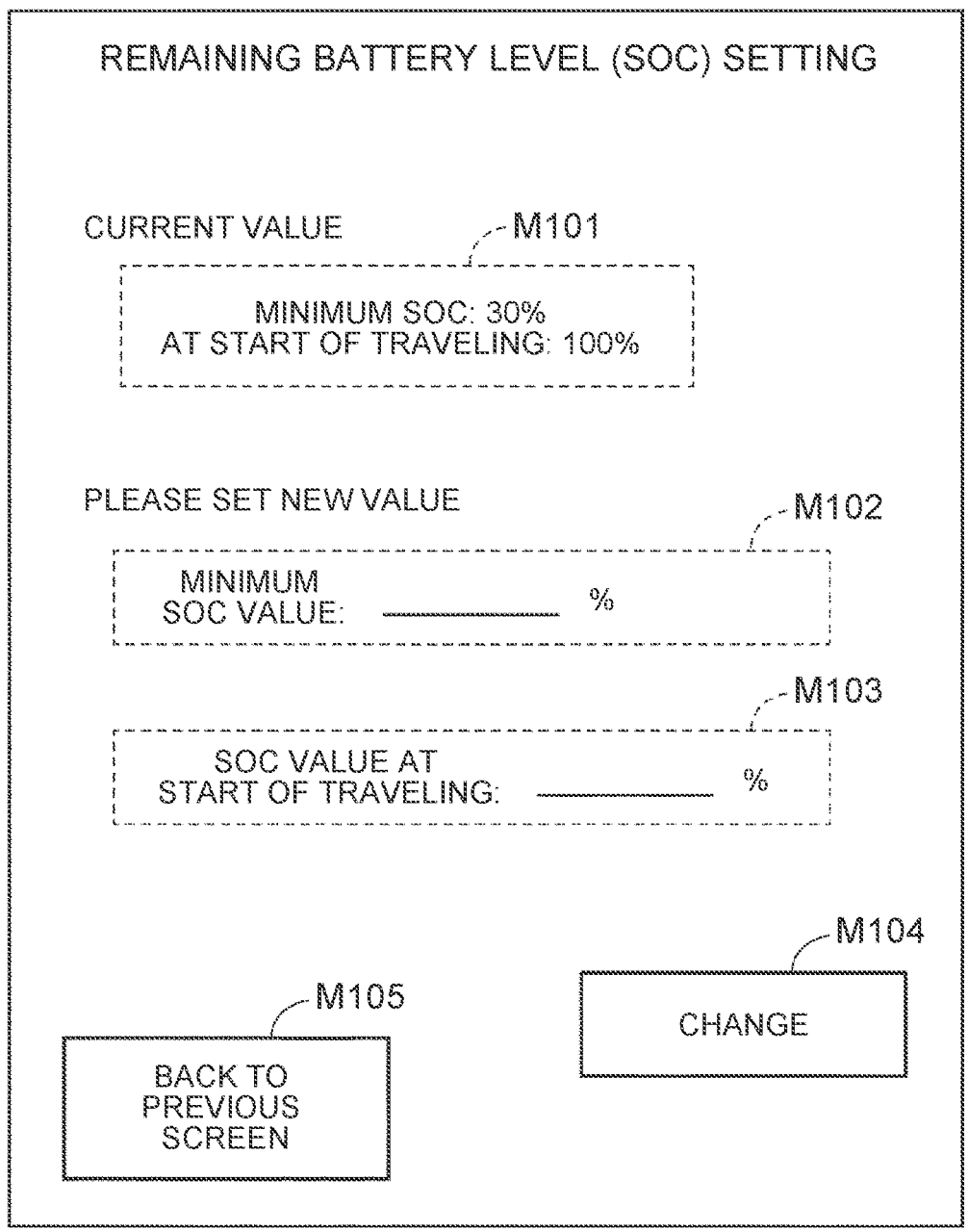
FIG. 6 is a diagram showing an example of a screen for changing setting of a charging condition shown in FIG. 5.

With reference to FIG. 6, the screen includes a charging condition M101, a minimum SOC input field M102, a target SOC input field M103, a change button M104, and a back button M105.

The charging condition M101 displays the current value of the minimum SOC and the current value of the target SOC (SOC at the start of traveling). The minimum SOC input field M102 accepts input of the minimum SOC value from the user. The target SOC input field M103 accepts input of the target SOC value from the user. The user can input a new minimum SOC value and a new target SOC value in the minimum SOC input field M102 and the target SOC input field M103, respectively, by operating the touch panel.

When the user operates the change button M104, the mobile terminal 300 transmits the minimum SOC and the target SOC input to the minimum SOC input field M102 and the target SOC input field M103, respectively, to each of the vehicle 200 and the vehicle agent 500. When the vehicle 200 receives the minimum SOC and the target SOC, the minimum SOC and the target SOC are set in the ECU 250. With the above, new charging parameters (the minimum SOC and the target SOC) are reflected in the charging control of the battery 230. When the vehicle agent 500 receives the minimum SOC and the target SOC, the minimum SOC and the target SOC are set in the bidding agent 530. With the above, the new minimum SOC and target SOC are reflected in the automatic bidding algorithm 532. When the user operates the back button M105, the screen shown in FIG. 5 is displayed again.

The screen shown in FIG. 5 further includes a trading partner condition M31 and a change button M32. When the user operates the change button M32, the mobile terminal 300 displays the screen shown in FIG. 7 that will be described below. FIG. 7 is a diagram showing an example of a trading partner condition setting screen.

With reference to FIG. 7, the screen includes a trading partner condition M201, a trading partner input field M202, a limitation button M203, a priority button M204, and a back button M205.

The trading partner condition M201 displays the trading partner currently set in the bidding agent 530. The trading partner input field M202 accepts input of trading partner conditions from the user. The user can select the trading partner condition by checking the check box. When the user selects "renewable energy", the trading partner condition requires that a sell bid of some kind of renewable energy is placed. When the user selects "solar power generation", the trading partner condition requires that a sell bid of electric power generated by solar power is placed. When the user selects "wind power generation", the trading partner condition requires that a sell bid of electric power generated by wind power is placed. When the user inputs the desired area in the trading partner input field M202 and selects "area designation", the trading partner condition requires that a sell bid of electric power generated in the desired area is placed. When the local area is designated as the desired area, local production for local consumption becomes possible. When the user inputs a personal ID in the trading partner input field M202 and selects "individual", the trading partner condition requires that the trading partner corresponds to the individual specified by the personal ID. A family member of the user (for example, a relative) may be specified by the personal ID.

When the user operates the limitation button M203, the trading partner of automatic bidding is limited to the trading partner satisfying the condition input in the trading partner condition M201. Specification of the consignment source with the personal ID makes self-consignment possible.

When the user operates the priority button M204, the condition input to the trading partner condition M201 is set in the bidding agent 530 as the priority trading partner condition. In this case, the bidding agent 530 places a purchase bid under the trading partner condition (priority trading partner condition) input in the trading partner condition M201, and when the purchase bid is not successful, the bidding agent 530 places a purchase bid excluding the priority trading partner condition. The bidding agent 530 may be configured such that the priority of the trading partner can be set.

When the user operates the back button M205, the screen shown in FIG. 5 is displayed again. In the above, an example in which the user changes the charging condition and the trading partner condition at the timing when the target period elapses has been described. However, the present disclosure is not limited to this, and the mobile terminal 300 may be configured such that the user can operate the mobile terminal 300 at an arbitrary timing to change the charging condition and the trading partner condition.

The preference information according to the present embodiment has been described above. Next, each parameter (specifically, the price guard value, the price target value, the renewable energy target value, the minimum SOC value, and the target SOC value) included in the automatic bidding algorithm 532 will be described. The bidding agent 530 is configured to be able to set the price guard value, the price target value, the renewable energy target value, the minimum SOC value, and the target SOC value. Then, when these parameters are set in the bidding agent 530, the bidding agent 530 operates as described below.

The bidding agent 530 places an automatic bid to the extent that the power purchase unit price does not exceed the price guard value. The bidding agent 530 places an automatic bid such that the power purchase unit price becomes close to the price target value. The price target value is set to a value lower than the price guard value. The bidding agent 530 places an automatic bid such that the renewable energy ratio becomes close to the renewable energy target value. The bidding agent 530 prioritizes the price guard value over the renewable energy target value. The renewable energy tends to be more expensive than other types of electric power. However, the price of renewable energy may be cheaper depending on the weather conditions and time of day. The bidding agent 530 places an automatic bid such that the difference between the power purchase unit price and the price target value and the difference between the renewable energy ratio and the renewable energy target value are about the same.

The bidding agent 530 places an automatic bid to purchase electric power for charging the battery 230 such that the SOC of the battery 230 does not fall below the minimum SOC value. The bidding agent 530 places an automatic bid to purchase electric power for charging the battery 230 such that the SOC of the battery 230 reaches the target SOC value by the travel start time of the vehicle 200.

Figure 8:
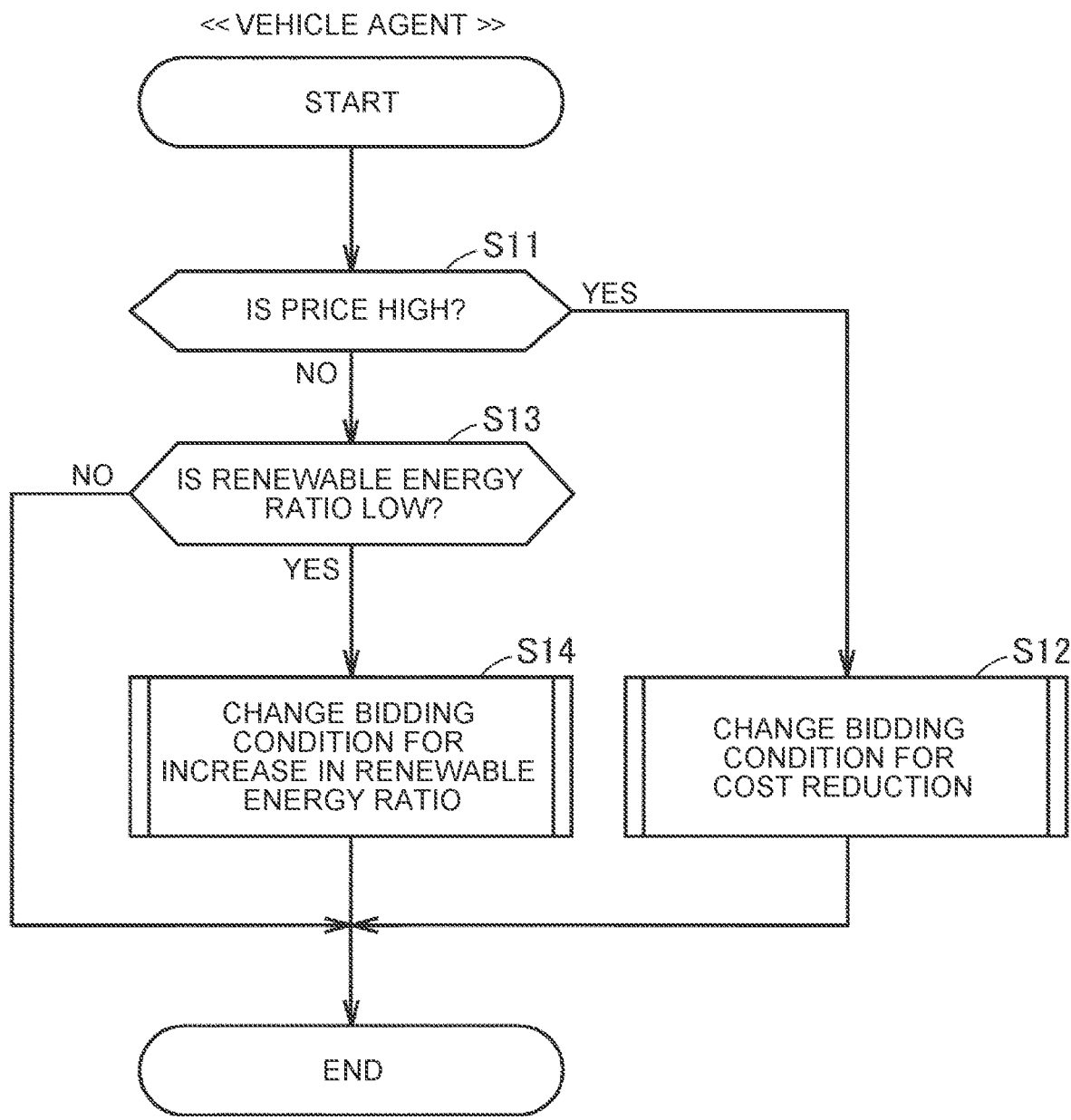
FIG. 8 is a flowchart showing a process related to bidding parameter setting executed by a trading condition setting unit shown in FIG. 4.
Figure 9:
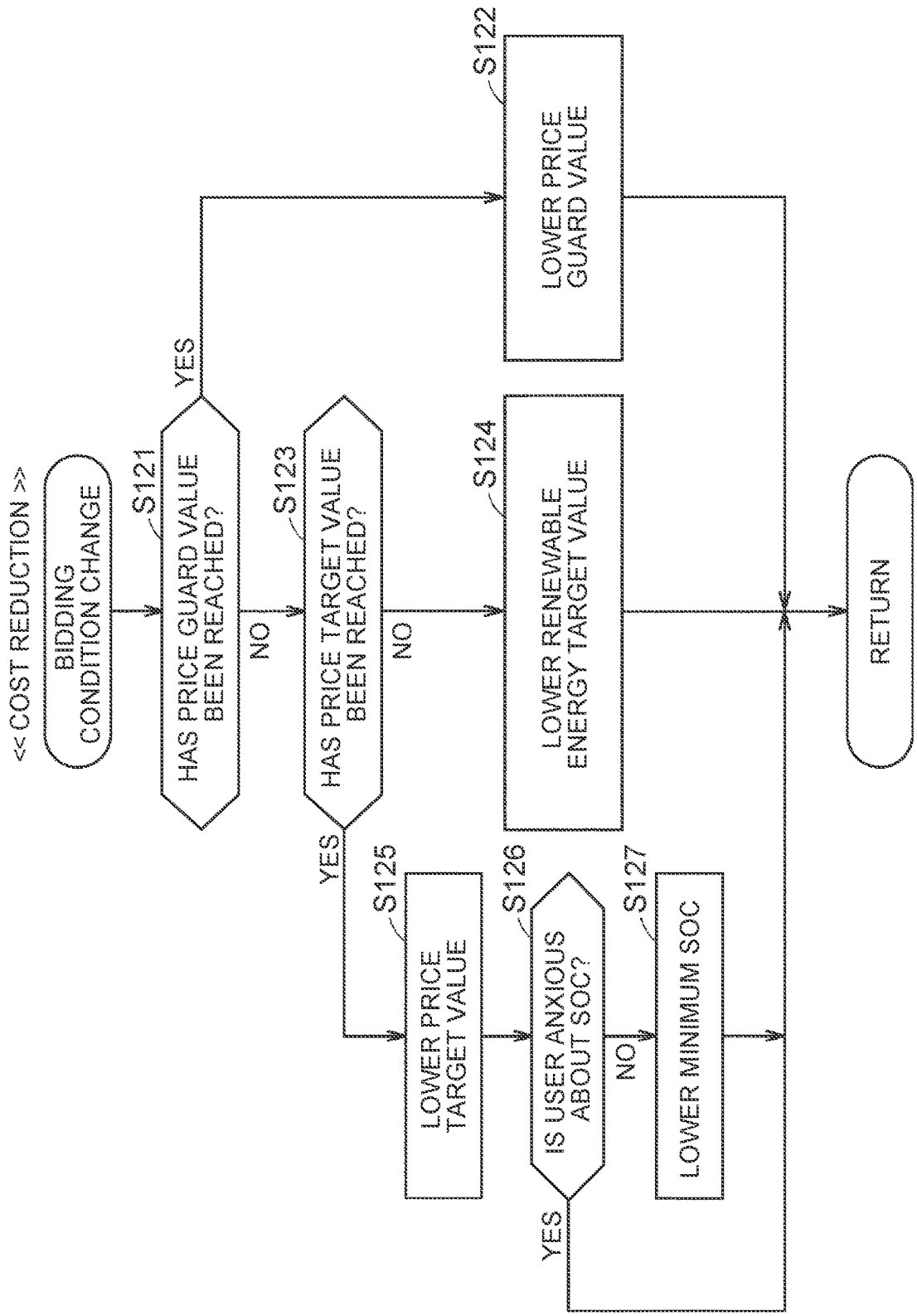
FIG. 9 is a flowchart showing details of changing bidding conditions for cost reduction shown in FIG. 8.
Figure 10:
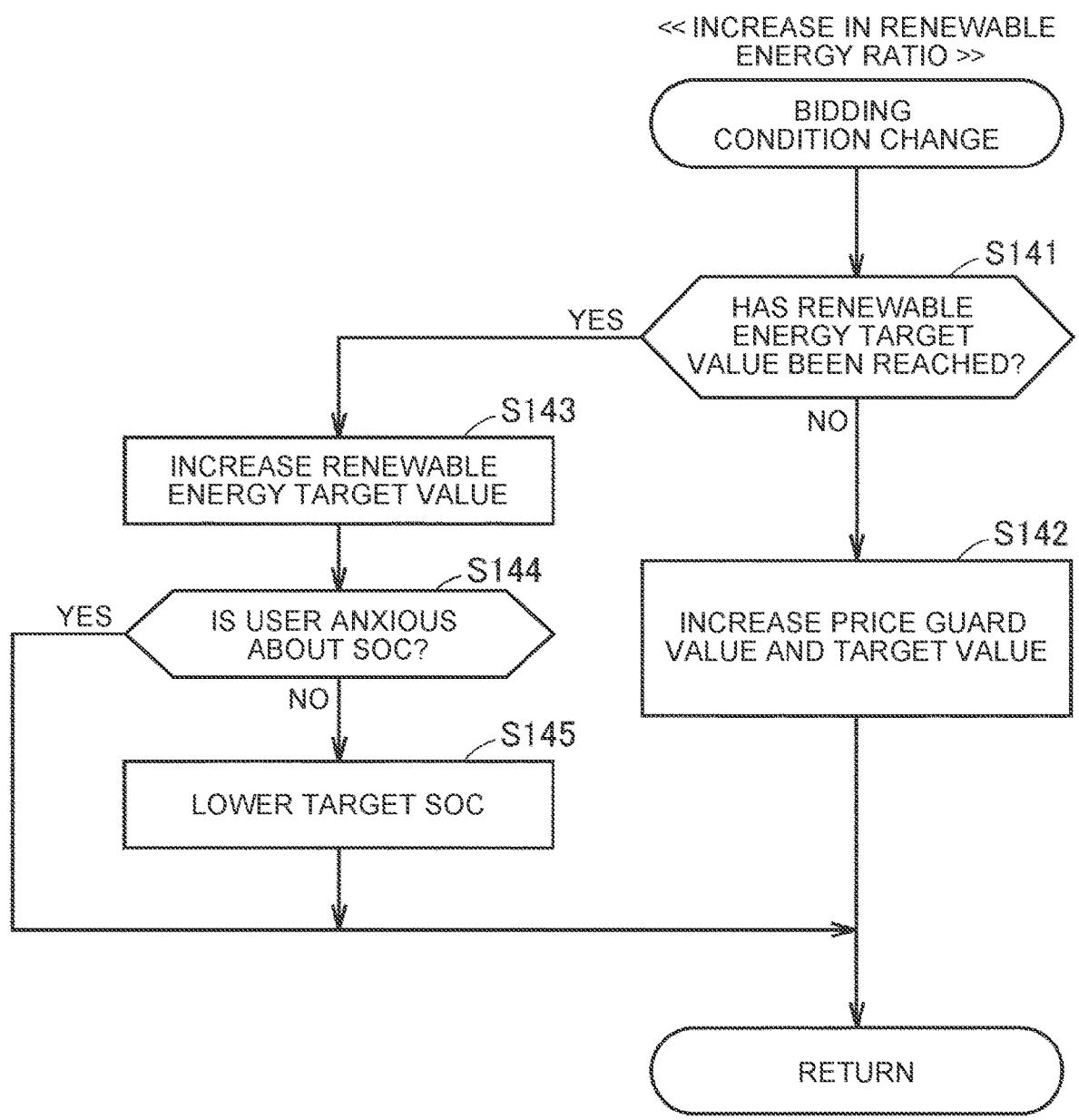
FIG. 10 is a flowchart showing details of changing bidding conditions for increasing a renewable energy ratio shown in FIG. 8.

With reference to FIGS. 8 to 10, the setting method of each parameter included in the automatic bidding algorithm 532 will be hereinafter described. Hereinafter, each step in the flowchart is simply represented by "S".

FIG. 8 is a flowchart showing a process related to bidding parameter setting executed by the trading condition setting unit 531. With reference to FIG. 8 together with FIG. 4, in S11, the trading condition setting unit 531 determines whether the user is not satisfied with the power purchase unit price in the target period (last month). When "the power purchase unit price is too high" is selected on the screen shown in FIG. 5, the result is determined as YES in S11, and the process proceeds to S12. When "the renewable energy ratio is too low" or "both are just right" is selected on the screen shown in FIG. 5, the result is determined as NO in S11, and the process proceeds to S13.

In S12, the bidding condition is changed to achieve cost reduction. FIG. 9 is a flowchart showing the details of S12. With reference to FIG. 9 together with FIG. 4, in S121, the trading condition setting unit 531 determines whether the power purchase unit price is equal to or higher than the price guard value. Since the power purchase unit price is guarded by the automatic bidding algorithm 532, the power purchase unit price does not exceed the price guard value in principle. However, it is possible that the power purchase unit price matches the price guard value. When the power purchase unit price matches the price guard value (YES in S121), the trading condition setting unit 531 lowers the price guard value in S122. With the above, the price guard value of the automatic bidding algorithm 532 is changed. The range of lowering may be a fixed value (for example, 0.5 yen/kWh) or may be variable. When the power purchase unit price is less than the price guard value (NO in S121), the process proceeds to S123.

In S123, the trading condition setting unit 531 determines whether the power purchase unit price is equal to or less than the price target value. When the power purchase unit price exceeds the price target value (NO in S123), the trading condition setting unit 531 lowers the renewable energy target value in S124. With the above, the renewable energy target value of the automatic bidding algorithm 532 is changed. The range of lowering may be a fixed value (for example, 5%) or may be variable.

When the extent that renewable energy ratio is insufficient with respect to the renewable energy target value is large, the bidding agent 530 purchases renewable energy even when the price is high. Therefore, as the renewable energy target value becomes higher, it becomes more difficult for the power purchase unit price to reach the price target value. When the renewable energy target value is lowered by the process in S124, the power purchase unit price can easily reach the price target value.

When the power purchase unit price is equal to or less than the price target value (YES in S123), the trading condition setting unit 531 lowers the renewable energy target value in S125. With the above, the price target value of the automatic bidding algorithm 532 is changed. The range of lowering may be a fixed value (for example, 0.5 yen/kWh) or may be variable.

In the following S126, the trading condition setting unit 531 determines whether the user is anxious about the remaining battery level in the target period (last month). When the check box of the second answer field M13 is not checked on the screen shown in FIG. 5, the result is determined as NO in S126, and the process proceeds to S127.

In S127, the trading condition setting unit 531 lowers the minimum SOC. With the above, the minimum SOC value of the automatic bidding algorithm 532 is changed. The range of lowering may be a fixed value (for example, 5%) or may be variable. After that, the vehicle agent 500 transmits the changed minimum SOC to the vehicle 200 via the mobile terminal 300. With the above, the changed minimum SOC is set in the ECU 250.

When the SOC of the battery 230 is lower than the minimum SOC value in the plug-in state, immediate charging up to the minimum SOC is executed in the vehicle 200 regardless of the price of electric power. The bidding agent 530 purchases electric power for immediate charging up to the minimum SOC even when the price of electric power is high. Therefore, as the minimum SOC becomes higher, the power purchase unit price accordingly tends to be higher. When the minimum SOC is lowered by the process in S127, the purchase of electric power by the bidding agent 530 at a low price is facilitated.

When the check box of the second answer field M13 is checked on the screen shown in FIG. 5, the result is determined as YES in S126, and S12 in FIG. 8 ends without changing the minimum SOC. Further, S12 in FIG. 8 ends also when any of the processes S122, S124, and S127 is executed. Then, when S12 in FIG. 8 ends, the series of processes shown in FIG. 8 ends.

In the present embodiment, when the information collection agent 510 receives user information indicating dissatisfaction of the user with the unit price of electric power (YES in S11 in FIG. 8), the bidding agent 530 changes the parameter of the automatic bidding algorithm 532 in any one of S122, S124, and S125 of FIG. 9 such that the unit price of the electric power purchased through automatic bidding is lowered. This facilitates the purchase of electric power at the power purchase unit price preferred by the user.

With reference to FIG. 8 together with FIG. 4, in S13, the trading condition setting unit 531 determines whether the user is not satisfied with the renewable energy ratio in the target period (last month). When "the renewable energy ratio is too low" is selected on the screen shown in FIG. 5, the result is determined as YES in S13, and the process proceeds to S14. When "both are just right" is selected on the screen shown in FIG. 5, the result is determined as NO in S13, and the series of processes shown in FIG. 8 ends without changing the bidding conditions.

In S14, the bidding condition is changed to increase the renewable energy ratio. FIG. 10 is a flowchart showing the details of S14. With reference to FIG. 10 together with FIG. 4, in S141, the trading condition setting unit 531 determines whether the renewable energy ratio is equal to or higher than the renewable energy target value. When the renewable energy ratio is less than the renewable energy target value (NO in S141), the trading condition setting unit 531 raises the price guard value and the price target value in S142. With the above, the price guard value and the price target value of the automatic bidding algorithm 532 are changed. The range of raising may be a fixed value (for example, 0.5 yen/kWh) or may be variable.

When the power purchase unit price may reach the price guard value, the bidding agent 530 preferentially purchases the electric power of which price is low. Further, when the difference between the power purchase unit price and the price target value (the amount that does not reach the price target) is larger than the difference between the renewable energy ratio and the renewable energy target value (the amount that does not reach the renewable energy target), the bidding agent 530 also preferentially purchases the electric lower of which price is low. Therefore, as the price guard value and the price target value become lower, it becomes more difficult for the renewable energy ratio to reach the renewable energy target value. When the price guard value and the price target value are raised by the process in S142, the renewable energy ratio can easily reach the renewable energy target value.

When the renewable energy ratio is equal to or higher than the renewable energy target value (YES in S141), the trading condition setting unit 531 raises the renewable energy target value in S143. With the above, the renewable energy target value of the automatic bidding algorithm 532 is changed. The range of raising may be a fixed value (for example, 5%) or may be variable.

In the following S144, the trading condition setting unit 531 determines whether the user is anxious about the remaining battery level in the target period (last month). The process in S144 is the same as the process in S126 in FIG. 9.

When the result is determined as NO in S144, the process proceeds to S145. In S145, the trading condition setting unit 531 lowers the target SOC. With the above, the minimum SOC value of the automatic bidding algorithm 532 is changed. The range of lowering may be a fixed value (for example, 5%) or may be variable. After that, the vehicle agent 500 transmits the changed target SOC to the vehicle 200 via the mobile terminal 300. With the above, the changed target SOC is set in the ECU 250.

The ECU 250 charges the battery 230 such that the SOC of the battery 230 reaches the target SOC value by the travel start time of the vehicle 200. Then, the bidding agent 530 purchases the electric power for such charging. As the target SOC increases, the electric energy purchased by the bidding agent 530 in the target period increases. As the purchased electric energy increases, the renewable energy ratio tends to decrease. When the target SOC is lowered by the process in S145, the renewable energy ratio easily increases.

When the result is YES in S144, S14 in FIG. 8 ends without changing the target SOC. Further, S14 in FIG. 8 also ends when any of the processes S142 and S145 is executed. Then, when S14 in FIG. 8 ends, the series of processes shown in FIG. 8 ends.

In the present embodiment, when the information collection agent 510 receives the user information indicating dissatisfaction of the user with the renewable energy ratio (ratio of renewable energy) (YES in S13 in FIG. 8), the bidding agent 530 changes the parameter of the automatic bidding algorithm 532 in S142 or S143 in FIG. 10 such that the ratio of renewable energy purchased through automatic bidding increases. This facilitates the purchase of the electric power at a renewable energy ratio preferred by the user.

The automatic bidding system according to the present embodiment includes the vehicle agent 500. Specifically, the vehicle agent 500 of each user is provided on the cloud. For example, with respect to the prosumer D1 that owns the power facility shown in FIG. 2, the vehicle agent 500 places an automatic bid for securing the electric power for the power facility (including the vehicle 200A) of the prosumer D1 while communicating with the mobile terminal 300A. The vehicle 200A and the mobile terminal 300A shown in FIG. 2 function as the vehicle 200 and the mobile terminal 300 shown in FIG. 4, respectively. Further, with respect to the consumer D2 that owns the power facility shown in FIG. 3, the vehicle agent 500 places an automatic bid for securing the electric power for the power facility (including the vehicle 200B) of the consumer D2 while communicating with the mobile terminal 300B. The vehicle 200B and the mobile terminal 300B shown in FIG. 3 function as the vehicle 200 and the mobile terminal 300 shown in FIG. 4, respectively.

Figure 11:
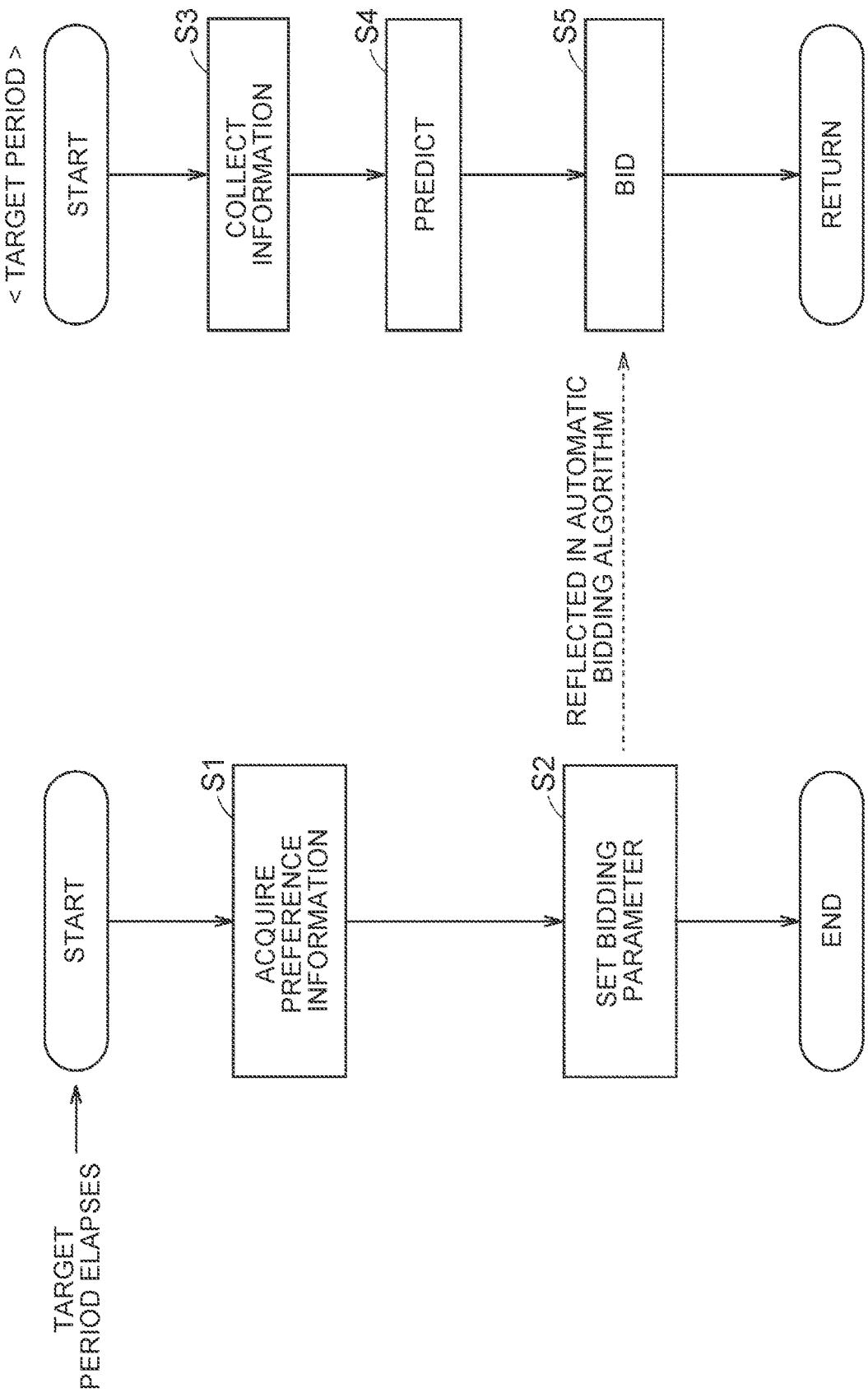
FIG. 11 is a flowchart showing an automatic bidding method for power trading according to the first embodiment.

FIG. 11 is a flowchart showing an automatic bidding method for power trading according to the present embodiment. With reference to FIG. 11 together with FIG. 4, the automatic bidding method for power trading according to the present embodiment includes preference information acquisition (S1), bidding parameter setting (S2), information collection (S3), prediction (S4), and bidding (S5). Each process in S1 to S5 is executed by the vehicle agent 500 (computer).

The processes in S1 and S2 are executed every time the target period elapses. In S1 the information collection agent 510 acquires preference information indicating the preference of the user from the mobile terminal 300 (see FIGS. 5 to 7). In S2, the trading condition setting unit 531 sets the parameters of the automatic bidding algorithm 532 using the preference information. Specifically, the process shown in FIG. 8 is executed. Further, the charging condition (FIG. 6) and the trading partner condition (FIG. 7) set by the user are reflected in the automatic bidding algorithm 532. The trading condition setting unit 531 may set an objective function for the optimization plan of the automatic bidding algorithm 532 so as to satisfy the charging condition and the trading partner condition set by the user.

The processes in S3 to S5 are repeatedly executed in a predetermined cycle within the target period. In S3, the information collection agent 510 acquires vehicle information (for example, the position, the SOC, the grid connection state, and the travel schedule) and the user information (for example, supply and demand information). Subsequently, in S4, the prediction agent 520 predicts the power price, the power storage capacity, and the required electric energy for each time slot. The required electric energy includes the electric energy required for charging corresponding to the minimum SOC and the target SOC. Subsequently, in S5, the bidding agent 530 is configured to place an automatic bid for the power trading in accordance with the automatic bidding algorithm 532 with respect to the electric power of the user. The preference of the user is reflected in the parameters of the automatic bidding algorithm 532 by the process in S2 above. The bidding agent 530 purchases the required electric energy for each time slot with reference to the prediction information obtained in S4.

According to the above-mentioned automatic bidding method for power trading, the purchase of electric power under the conditions preferred by the user is facilitated.

Second Embodiment

The automatic bidding system according to a second embodiment of the present disclosure will be described. Since the second embodiment has many portions in common with the first embodiment, the differences will be mainly described, and the description of the common portions will be omitted.

Figure 12:
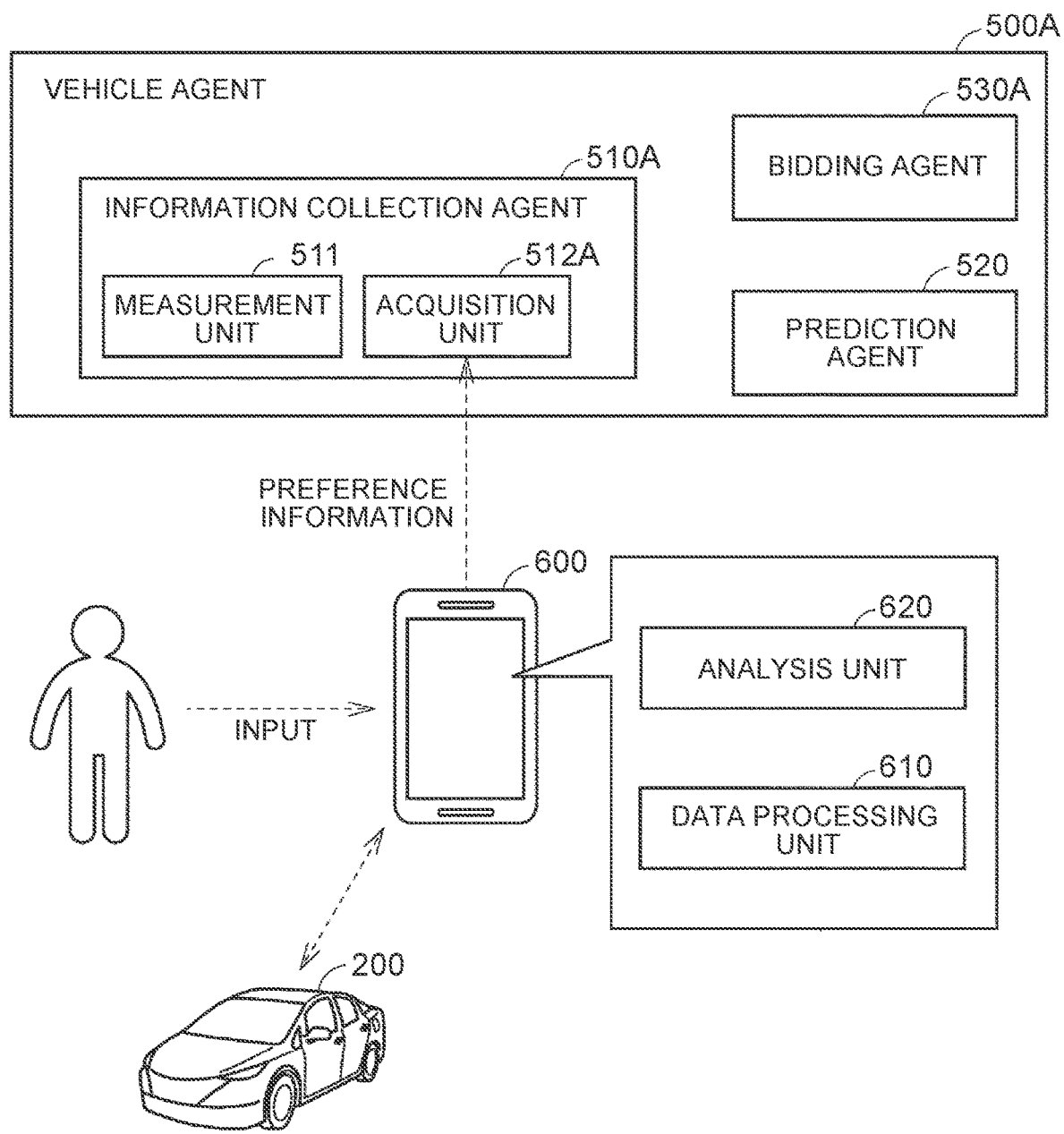
FIG. 12 is a diagram showing a schematic configuration of an automatic bidding system according to a second embodiment.

FIG. 12 is a diagram showing a schematic configuration of an automatic bidding system according to the second embodiment. With reference to FIG. 12, the automatic bidding system according to the second embodiment includes a vehicle agent 500A and a mobile terminal 600 in place of the vehicle agent 500 and the mobile terminal 300 (FIG. 4). The vehicle agent 500A includes an information collection agent 510A and a bidding agent 530A in place of the information collection agent 510 and the bidding agent 530 (FIG. 4). The information collection agent 510A includes an acquisition unit 512A in place of the request unit 512 (FIG. 4). The mobile terminal 600 is, for example, a smartphone provided with a touch panel display. In the present embodiment, the information collection agent 510A, the bidding agent 530A, and the mobile terminal 600 correspond to examples of an "information collection unit", a "bidding unit", and a "user terminal" according to the present disclosure, respectively.

The acquisition unit 512A is configured to acquire the preference information indicating the preference of the user from the mobile terminal 600 operated by the user. The mobile terminal 600 includes a data processing unit 610 and an analysis unit 620. In the present embodiment, the mobile terminal 600 is configured to receive voice input from the user. The mobile terminal 600 includes a built-in smart speaker, for example. Further, the mobile terminal 600 includes a built-in processor and a storage device for storing a program. In the mobile terminal 600, for example, a processor and a program executed by the processor embody the data processing unit 610 and the analysis unit 620. However, the present disclosure is not limited to this, and each unit may be embodied by dedicated hardware (electronic circuit).

The data processing unit 610 is configured to extract information on the preference of the user from the information (for example, voice information) input from the user to the mobile terminal 600. The analysis unit 620 is configured to analyze information on the preference of the user and determine whether the preference of the user is a price priority or a renewable energy priority. The price priority is a preference for reduction of the power purchase unit price rather than an increase in the renewable energy ratio. The renewable energy priority is a preference for increasing the renewable energy ratio rather than reduction of the power purchase unit price. The mobile terminal 600 according to the present embodiment classifies the preference of the user based on the analysis result of the voice information input from the user. With the above, the preference information indicating whether the preference of the user is the price priority or the renewable energy priority is generated. Then, the mobile terminal 600 transmits the preference information generated by the analysis unit 620 to the vehicle agent 500A (cloud server).

Figure 13:
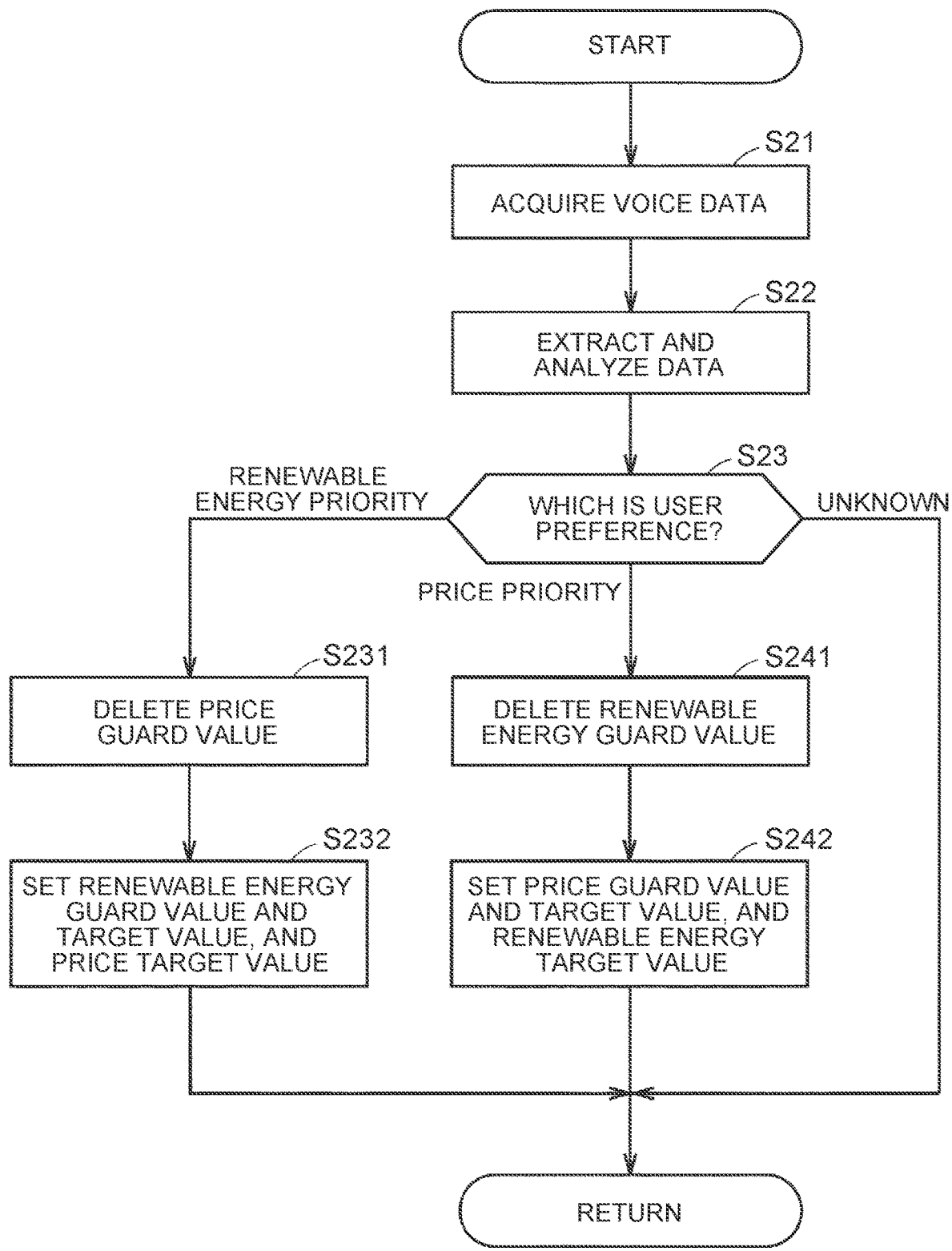
FIG. 13 is a flowchart showing a process related to acquisition of preference information and bidding parameter setting executed by the automatic bidding system shown in FIG. 12.

FIG. 13 is a flowchart showing a process related to acquisition of the preference information and bidding parameter setting executed by the automatic bidding system according to the second embodiment. The process shown in this flowchart is repeatedly executed.

With reference to FIG. 13 together with FIG. 12, in S21, the mobile terminal 600 acquires voice data. The voice data is input from the user to the mobile terminal 600. The mobile terminal 600 acquires the voice data of the user from, for example, a conversation of the user. The mobile terminal 600 may identify the voice of the user based on the characteristics of the voice of the user.

In S22, the mobile terminal 600 executes the above-mentioned information extraction and analysis. When the preference information is generated by the process in S22, the mobile terminal 600 transmits the generated preference information to the vehicle agent 500A. As a result of analyzing the conversation of the user, the mobile terminal 600 generates the preference information indicating that the preference of the user is the renewable energy priority, for example, when the mobile terminal 600 determines that there are more environmental topics than economic topics, and generates the preference information indicating that the preference of the user is the price priority when the mobile terminal 600 determines that there are more economic topics than environmental topics. When the preference information is generated by the process in S22 due to lack of information, the mobile terminal 600 does not transmit the preference information to the vehicle agent 500A.

In the following S23, the bidding agent 530A determines whether the preference of the user is the price priority or the renewable energy priority based on the preference information received from the mobile terminal 600. When the preference of the user is the renewable energy priority ("renewable energy priority" in S23), the processes in S231 and S232 are executed. When the preference of the user is the price priority ("price priority" in S23), the processes in S241 and S242 are executed. When the bidding agent 530A does not receive the preference information ("unknown" in S23), the bidding parameter setting by the bidding agent 530A is not executed, and the process returns to the first step (S21).

In S231, the bidding agent 530A deletes the price guard value of the automatic bidding algorithm 532. With the above, the price guard value is not set, and the price guard (the upper limit of the price) is canceled. In the following S232, the bidding agent 530A sets the price target value, the renewable energy target value, and a renewable energy guard value of the automatic bidding algorithm 532. When the renewable energy guard value is set, the bidding agent 530A places an automatic bid such that the renewable energy ratio does not fall below the renewable energy guard value. The bidding agent 530A prioritizes the renewable energy guard value over the price target value. The bidding agent 530A places an automatic bid such that the renewable energy ratio is equal to or higher than the renewable energy guard value even when the price of renewable energy is high.

When at least one of the price target value, the renewable energy target value, and the renewable energy guard value is not set, an initial value is set to each of the price target value, the renewable energy target value, and the renewable energy guard value in S232. Each initial value is a preset value and can be arbitrarily set by the user. When each of the price target value, the renewable energy target value, and the renewable energy guard value has already been set, the process shown in FIG. 10 is executed in S232. However, the process in S142 in FIG. 10 is changed to a process of raising each of the price target value and the renewable energy guard value. Each of the price target value, the renewable energy target value, and the renewable energy guard value is updated by the process in S232. When the process in S232 is executed, the process returns to the first step (S21).

In S241, the bidding agent 530A deletes the renewable energy guard value of the automatic bidding algorithm 532. With the above, the renewable energy guard value is not set, and the renewable energy guard (the lower limit of the renewable energy ratio) is canceled. In the following S242, the bidding agent 530A sets the price guard value, the price target value, and the renewable energy target value of the automatic bidding algorithm 532.

When at least one of the price guard value, the price target value, and the renewable energy target value is not set, the initial value is set to each of the price guard value, the price target value, and the renewable energy target value in S242. Each initial value is a preset value and can be arbitrarily set by the user. When each of the price guard value, the price target value, and the renewable energy target value has already been set, the process shown in FIG. 9 is executed in S242. Each of the price guard value, the price target value, and the renewable energy target value is updated by the process shown in FIG. 9. When the process in S242 is executed, the process returns to the first step (S21).

The power trading condition (parameters of the automatic bidding algorithm 532) can be changed in accordance with the change in the preference of the user as the process shown in FIG. 13 above is repeatedly executed.

In the second embodiment above, the mobile terminal 600 is configured to classify the preference of the user based on the analysis result of the voice information input from the user. According to such a configuration, the preference information (information indicating the preference of the user) is automatically generated based on the conversation of the user. However, the mobile terminal 600 is not limited to such a configuration, and the mobile terminal 600 may be configured to infer a behavior pattern of the user based on the information input from the user and classify the preference of the user based on the inferred behavior pattern of the user. The mobile terminal 600 may execute the process shown in FIG. 14 that will be described later, instead of the process shown in FIG. 13.

Figure 14:
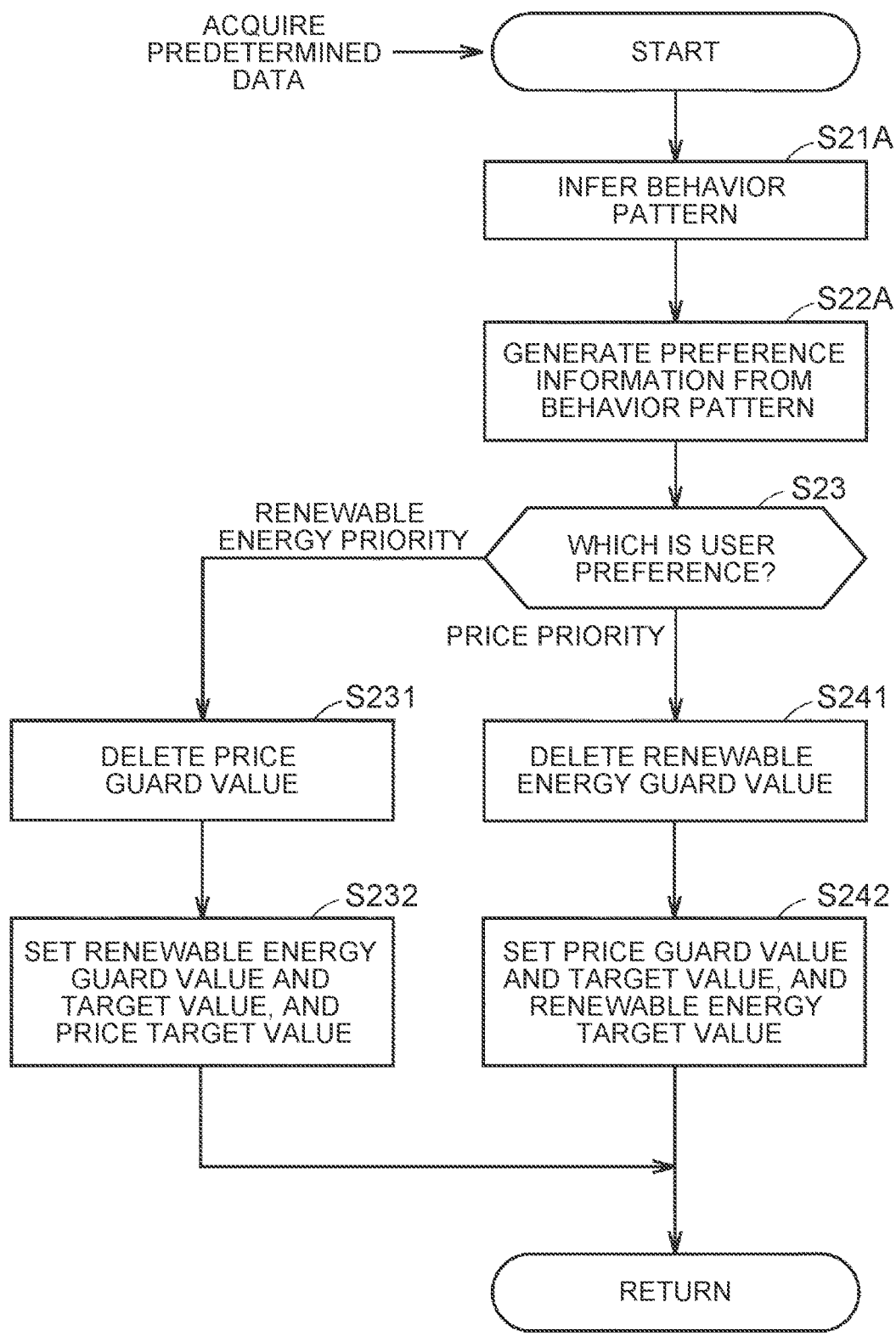
FIG. 14 is a flowchart showing a modification of the process shown in FIG. 13.

FIG. 14 is a flowchart showing a modification of the process shown in FIG. 13. The process shown in FIG. 14 is the same as the process shown in FIG. 13, except that S21A and S22A are adopted instead of S21 and S22 (FIG. 13). However, the process shown in FIG. 14 is executed when the mobile terminal 600 acquires predetermined data. The predetermined data is data based on which the behavior pattern of the user can be inferred. Hereinafter, S21A and S22A will be described.

With reference to FIG. 14 together with FIG. 12, in S21A, the mobile terminal 600 infers the behavior pattern of the user from the predetermined data. The predetermined data may be information extracted from at least one of the history of search words in the search service, the information uploaded to a social networking service (SNS), the location information by the global positioning system (GPS), and the history of the destination set in the car navigation system. The mobile terminal 600 can identify the behavior pattern of the user (for example, a store that the user often visits in daily life) based on the predetermined data.

In S22A, the mobile terminal 600 generates the preference information of the user from the behavior pattern of the user. For example, when the store that the user often visits is an environmentally friendly store (for example, a natural or organic store), the preference information indicating that the preference of the user is the renewable energy priority is generated. However, when the store that the user often visits is a store that is not an environmentally friendly store, the preference information indicating that the preference of the user is the price priority is generated. Then, the mobile terminal 600 transmits the generated preference information to the vehicle agent 500A.

With the automatic bidding system according to the above modification, the preference information (information indicating the preference of the user) is automatically generated based on the behavior pattern of the user. Then, the power trading condition (parameters of the automatic bidding algorithm 532) are sequentially updated in accordance with the change in the preference of the user.

OTHER EMBODIMENTS

In each of the above embodiments, the renewable energy ratio is adopted as the purchased power ratio. However, the purchased power ratio is not limited to this, and may be a ratio of a specific renewable energy (for example, electric power generated by wind power generation) to the entire electric power purchased by the bidding agent in the target period. Further, the purchased power ratio may be the ratio of the electric power generated in a predetermined area (for example, the electric power generated locally) to the entire electric power purchased by the bidding agent in the target period.

The initial value of the target SOC may be 100%. After that, the vehicle agent 500 may gradually lower the target SOC value until the user feels anxiety while confirming whether the user is anxious about the remaining battery level using a questionnaire (see FIG. 5), and may search for (learn) the limit value (the lower limit value) of the target SOC at which the user does not feel anxiety.

The parameters of the automatic bidding algorithm are not limited to those shown in each of the above embodiments, and can be changed as appropriate. In the mode in which the bidding agent automatically places both purchase and sell bids, the power unit price expressed by the formula "power unit price=power purchase unit price–power sales unit price" may be adopted instead of the power purchase unit price. Alternatively, the power purchase unit price and the power sales unit price may be managed separately.

In the prosumer D1 shown in FIG. 2, an in-vehicle battery is used as a power storage device for storing electric power generated by the solar panel 110 (solar power generation facility). However, the present disclosure is not limited to this, and the prosumer D1 (FIG. 1) may own a stationary power storage device as a power storage device for storing the electric power generated by the solar power generation facility.

In each of the above embodiments, the vehicle and the vehicle agent do not directly communicate with each other, and communicate with each other via the mobile terminal. However, the present disclosure is not limited to this mode. The vehicle may be equipped with a wireless communication device (for example, a data communication module (DCM)) that can access the mobile communication network (telematics), and may directly communicate with the vehicle agent wirelessly. The vehicle may also communicate with the vehicle agent via the EVSE.

In each of the above embodiments, the mobile terminal is adopted as the user terminal. However, the present disclosure is not limited to this, and any terminal belonging to the user can be adopted as the user terminal. For example, the user terminal may be an on-board terminal (for example, a navigation system).

In the above embodiments, an individual-owned vehicle (POV) is referred to. However, the present disclosure is not limited to this, and a Mobility as a Service (MaaS) vehicle may be adopted instead of the POV. The MaaS vehicle is a vehicle managed by a MaaS service provider.

The vehicle is not limited to a BEV not equipped with an internal combustion engine, and may be a plug-in hybrid electric vehicle (PHEV) equipped with an internal combustion engine. The vehicle is not limited to a passenger car, and may be a bus or a truck. The vehicle may be configured to be rechargeable in a non-contact manner. The vehicle may be configured to be able to perform autonomous driving or may be equipped with a flight function. The vehicle may be an unmanned vehicle (for example, a robotaxi, an automated guided vehicle (AGV), or an agricultural machine).

In each of the above embodiments, the vehicle agent is provided on the cloud. However, the present disclosure is not limited to this, and at least a part of the functions of the vehicle agent may be implemented in the on-premises server, the vehicle, or the mobile terminal.

The power grid PG is not limited to a large-scale AC grid, and may be a micro grid or a DC grid. The vehicle may be equipped with a charger or a charger-discharger for DC power.

In the above embodiments, a V1G type xEV (a type of xEV that unilaterally receives supply of electric power from the power grid) is adopted. However, the present disclosure is not limited to this, and xEV having at least one of a vehicle to grid (V2G) function (a function of exchanging electric power bidirectionally with the power grid) and a vehicle to home (V2H) function may be adopted. The vehicle may include a charger-discharger instead of the charger 220 (FIG. 2). The function of the charger-discharger may be mounted on the EVSE instead of the vehicle. The charger-discharger may be built in the connector of the charging cable. In the prosumer D1 shown in FIG. 2, the control device 125 may reverse power flow of the generated power of the solar panel 110 with respect to the power grid PG in accordance with an instruction from the user. The ECU 250 in which the maximum SOC value is set may execute discharge control of the battery 230 such that the SOC of the battery 230 does not exceed the maximum SOC value.

The embodiments disclosed herein should be considered to be exemplary and not restrictive in all respects. The scope of the present disclosure is shown by the scope of claims rather than the description of the embodiments above, and is intended to include all modifications within the meaning and the scope equivalent to the scope of claims.

What is claimed is:
1. An automatic bidding system,
the system comprising a computer and a vehicle including a power storage device, wherein:
the computer includes
a bidding unit that places an automatic bid for power trading in accordance with an automatic bidding algorithm related to electric power of a user, and
an information collection unit that acquires user information indicating a preference of the user;
the bidding unit is configured to set a parameter of the automatic bidding algorithm using the user information;
the vehicle of the user is equipped with the power storage device that is chargeable using electric power purchased by the bidding unit;
the bidding unit is configured to be able to set a target state-of-charge value of the power storage device mounted on the vehicle;
the bidding unit is configured to purchase electric power for charging the power storage device such that a state-of-charge of the power storage device reaches the target state-of-charge value by a travel start time of the vehicle; and
the bidding unit is configured to be able to set a minimum state-of-charge value of the power storage device; and prevent the state-of-charge of the power storage device from falling below the target state-of-charge value.

2. The automatic bidding system according to claim 1, wherein the information collection unit is configured to notify the user of a power trading result by the bidding unit in a predetermined period, and request the user for returning the user information indicating whether the user is satisfied with the power trading result.

3. The automatic bidding system according to claim 2, wherein:
   the power trading result includes a unit price of electric power purchased by the bidding unit in the predetermined period and a ratio of predetermined electric power to the electric power purchased by the bidding unit in the predetermined period;
   when the information collection unit receives the user information indicating that the user is not satisfied with the unit price of electric power, the bidding unit changes the parameter of the automatic bidding algorithm such that the unit price of electric power to be purchased through automatic bidding is reduced; and
   when the information collection unit receives the user information indicating that the user is not satisfied with the ratio of the predetermined electric power, the bidding unit changes the parameter of the automatic bidding algorithm such that the ratio of the predetermined electric power to be purchased through automatic bidding is increased.

4. The automatic bidding system according to claim 2, wherein:
   the predetermined period is set each time the predetermined period elapses; and
   the information collection unit is configured to repeatedly notify the power trading result and request for returning the user information each time the predetermined period elapses.

5. The automatic bidding system according to claim 1, further comprising a user terminal operated by the user, wherein:
   the information collection unit is configured to acquire the user information from the user terminal; and
   the user terminal is configured to generate the user information using information input from the user and transmit the generated user information to the computer.

6. The automatic bidding system according to claim 5, wherein the user terminal is configured to classify a preference of the user based on an analysis result of voice information input from the user.

7. The automatic bidding system according to claim 5, wherein the user terminal is configured to infer a behavior pattern of the user based on the information input from the user and classify a preference of the user based on the inferred behavior pattern of the user.

8. An automatic bidding method for power trading, the method comprising:
   acquiring, by a computer, user information indicating a preference of a user;
   setting, by the computer, a parameter of an automatic bidding algorithm using the user information;
   placing, by the computer, an automatic bid for the power trading related to electric power of the user in accordance with the automatic bidding algorithm; and
   purchasing electric power for charging a power storage device of a vehicle such that a state-of charge of the power storage device reaches a target state-of-charge value by a travel start time of the vehicle; and the state-of-charge of the power storage device is prevented from falling below the target state-of-charge of the power storage device.

* * * * *